US008725470B1

(12) United States Patent
Brown et al.

(10) Patent No.: US 8,725,470 B1
(45) Date of Patent: May 13, 2014

(54) CO-OPTIMIZATION OF BLUNT BODY SHAPES FOR MOVING VEHICLES

(75) Inventors: James L. Brown, Cupertino, CA (US); Joseph A Garcia, Belmont, CA (US); David J. Kinney, Manteca, CA (US); Jeffrey V Bowles, Mountain View, CA (US); Nagi N Mansour, Hillsborough, CA (US)

(73) Assignee: The United States of America as Represented by the Administrator of the National Aeronautics & Space Administration (NASA), Washington, DC (US)

( * ) Notice: Subject to any disclaimer, the term of this patent is extended or adjusted under 35 U.S.C. 154(b) by 442 days.

(21) Appl. No.: 13/109,954

(22) Filed: May 17, 2011

Related U.S. Application Data

(60) Provisional application No. 61/397,146, filed on May 17, 2010.

(51) Int. Cl.
*G06F 7/60* (2006.01)
*G06F 17/10* (2006.01)

(52) U.S. Cl.
USPC .......................................................... 703/2

(58) Field of Classification Search
None
See application file for complete search history.

(56) References Cited

U.S. PATENT DOCUMENTS 7,431,242 B1 10/2008 Brown et al.

OTHER PUBLICATIONS

Barr, Superquadrics and Angle-Preserving Transformations, IEEE Computer Graphics and Applications, Jan. 1981, 11-23, 1 (1).
Barr, Rigid Physically Based Superquadrics, Graphics Gems III—Ch. 111.8, edited by D. Kirk, 1992, 137-159.
Brown, The Effect of Forebody Geometry on Turbulent Heating and Thermal Protection System Sizing for Future Mars Missions Concepts, Proceedings of the International Planetary Probe Workshop, Jun. 4, 2006.
Brown, et al., An Asymmetric Capsule Vehicle Geometry Study for CEV, 45th AIAA Aerospace Sciences Meeting and Exhibit, Jan. 8-11, 2007, Reno, Nevada, American Institute of Aeronautics and Astronautics.
Garcia, et al., Parametric Co-Optimization of Lifting Blunt Body Vehicle Concepts for Atmospheric Entry, 21st International Conference on Parallel Computational Fluid Dynamics, May 18-22, 2009, Moffett Field, California.
Wright, et al., Mars Aerocapture Systems Study, NASA TM-2006-214522, Nov. 2006.

*Primary Examiner* — Saif Alhija
(74) *Attorney, Agent, or Firm* — John F. Schipper; Christopher J. Menke; Robert M. Padilla

(57) ABSTRACT

A method and associated system for multi-disciplinary optimization of various parameters associated with a space vehicle that experiences aerocapture and atmospheric entry in a specified atmosphere. In one embodiment, simultaneous maximization of a ratio of landed payload to vehicle atmospheric entry mass, maximization of fluid flow distance before flow separation from vehicle, and minimization of heat transfer to the vehicle are performed with respect to vehicle surface geometric parameters, and aerostructure and aerothermal vehicle response for the vehicle moving along a specified trajectory. A Pareto Optimal set of superior performance parameters is identified.

30 Claims, 21 Drawing Sheets

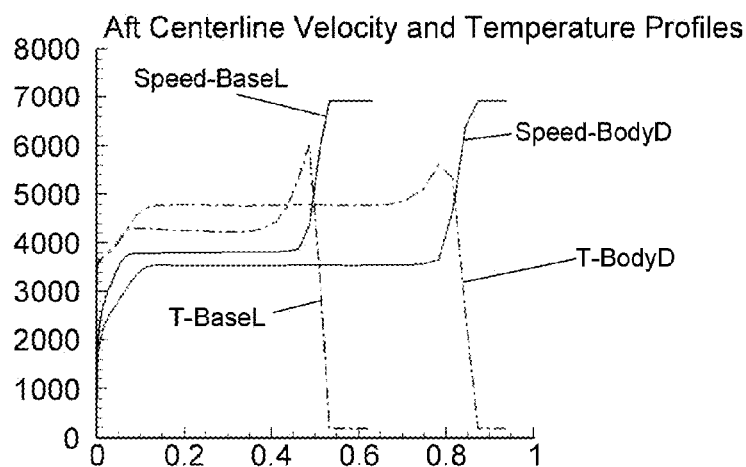
FIG. 13A
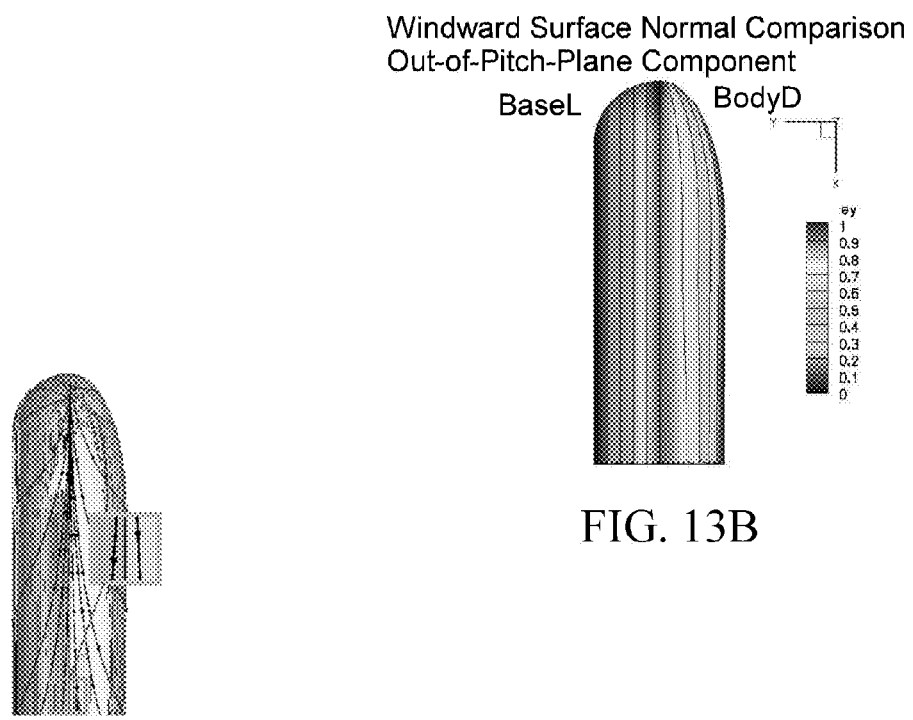
FIG. 13B
FIG. 13C

CO-OPTIMIZATION OF BLUNT BODY SHAPES FOR MOVING VEHICLES

PRIORITY CLAIM

This application claims the benefit of U.S. Provisional Application No. 61/397,146, filed May 17, 2010, which is hereby incorporated by reference.

ORIGIN OF THE INVENTION

The invention described herein was made by employees of the United States Government and may be manufactured and used by or for the Government of the United States of America for governmental purposes without the payment of any royalties thereon or therefor.

FIELD OF THE INVENTION

This invention relates to optimization of geometric parameters for blunt bodies for moving vehicles, such as re-entry vehicles, based upon control of heat transfer, aerothermodynamics, aerodynamics and structural responses.

BACKGROUND OF THE INVENTION

Vehicles designed for exploration of the planets, satellites and other atmospheric bodies in the Solar System favor the use of mid-L/D (Lift/Drag) lifting blunt body geometries. Such shapes can be designed to yield favorable hypersonic heat transfer and aerothermodynamic properties for low heating and hypersonic aerodynamic properties for maneuverability and stability, coupled with desirable terminal low supersonic/transonic aerodynamics, flexible trajectory design based on long down-range and cross-range performance. This includes precise control of landing site and high delivered payload mass with low packing density to better satisfy mission goals and economics. Entry trajectory selection will influence entry peak heating and integrated heat loads, which in turn will influence selection and design of the vehicle thermal protection system (TPS). Thus, a nominal trajectory must be determined for each shape considered. The vehicle will be subject to both launch and entry loading to meet structural integrity constraints that may further influence shape design. Further, such vehicles must be practical, be sized to fit on existing or realizable launch vehicles, often within existing launch payload-fairing constraints.

Past missions to planets, such as Mars and Venus, and even reentry into Earth have predominantly used a capsule configuration, either with a truncated sphere section, such as the Apollo and Soyuz configurations, or with a sphere-cone design, such as the Viking and Pathfinder series of probes. However, these vehicles are of limited lift and maneuverability and have probably reached the upper limit of their practical payload deliverability. In contrast, high-lift winged vehicles such as NASA's Shuttle Orbiter have proven to be expensive to operate and vulnerable to launch debris as a consequence of their launch configuration.

What is needed is a simultaneous optimization approach that (1) takes account of the atmosphere and environmental characteristics through which the vehicle will move, (2) uses a multi-disciplinary approach to simultaneously optimize structural, aerodynamic, aerothermodynamic, heat transfer and material responses of the vehicle, through choice of geometric parameters and materials associated with the vehicle, and (3) provides a mechanism for comparison of optimal vehicle performances using different approaches.

SUMMARY OF THE INVENTION

These needs are met by the invention, which provides a parametric class of closed convex hull shapes, herein referred to as Co-Optimized Blunt Re-entry Aeroshell-Super Quadric vehicle geometry (COBRA-SQ) shapes, and a multi-disciplinary optimization (MDO) process, herein referred to as COBRA MDO, which may be used to perform a sequence of design optimization and performance confirmation processes. Initially, classes of shapes and corresponding flow characteristics are examined to identify the most appropriate classes of vehicle geometry to achieve specified key performance parameters, given the applicable constraints. Initial optimization studies of the surviving classes are performed to broadly identify the best-performing sub-classes, based on relative weights assigned to integrated and localized heat transfer rates, structural and aerothermodynamic responses, using multi-disciplinary analyses of these factors.

These responses will depend upon environmental parameters, such as the characteristics of the atmosphere traveled through, the weight distribution within the vehicle initial velocity of (re)entry, the mass of the planetary body, the initial angle of attack, and other relevant factors, and these parameters will change with the environment. The top candidates within a sub-class are analyzed further to identify parameter values for maximum performance and sensitivity of these maximum performance values to small changes in one or more environmental and/or geometric parameters.

The general shape of the COBRA-SQ defines the vehicle aeroshell shape, without any additional human effort being required. This permits automated optimization, or search for optimum aeroshell shape(s) with the desired aerodynamic and aerothermal properties. These parameters determine certain aerostability properties, such as lift and drag forces and pitch and yaw moments on the vehicle. In addition, the aeroshell shape optimization will determine the structural design required, because of the aeroloads and the thermal protection design requirements arising from the convective and radiative heating.

The following sections provide a detailed description of the parametric CobraSQ geometry family of shapes, and of construction of a generic form of the Cobra MDO design process, making use of the geometry, along with stated constraints and objectives, and describe a specific multi-disciplinary optimization (MDO) software implementation and application of these concepts and software in the design of a prototype Mars reentry vehicle of intermediate payload. FIGS. 1A, 1B and 1C illustrate sectional views of a general blunt body surface used for analysis in the invention, in perspective, top and side views, respectively.

We have developed a parametric class of mid-value Lift/Drag ratio (L/D) lifting blunt body vehicle geometries or shapes that are suitable for entry into and maneuvering within the atmospheres of those various planets and bodies which have atmospheres and which are suitable for use within a multi-objective optimization design process. The vehicle outer shape is based on piecewise C2 continuous, analytical geometric segments joined together at a limited number of seam lines with at least C1 continuity for which the geometry and analysis grids can be rapidly created from a limited set of parameters which, once defined, can be interpreted in a clear and intuitive manner.

At most eight sets of geometric parameters are used to describe the entry body shape, expressed as a super-quadric (resembling an ellipsoid, but with generalization of the usual second degree exponents). The shape functions independently characterize a nose section shape (upper and lower), a base rib section shape (upper and lower), an aft-body section shape (upper and lower), a keel line shape and a water line shape, which are required to join together with at least C1 continuity at certain interfaces. Each of these five body section shapes is expressed as a super-quadric function in Cartesian coordinates (x,y,z) of the form, $$(x/x1)^a + ((y/y1)^b + (z/z1)^b)^{a/b} = 1, \quad (1)$$

where x1, y1 and z1 are positive semi-axis lengths, a and b are exponents with values greater than 1, and the x-axis is oriented from back to front, as illustrated in FIGS. 2A, 2B and 2C; or for some of the surface segments (base rib, lower keel line, upper keel line and water line), only two of the three coordinates (x,y,z) are present in the corresponding shape function which may be expressed making use of a combination of linear segment and/or segments of a super-ellipse of the form, $$(y/y1)^b + (z/z1)^b = \{1 - (x/x1)^a\}^{b/a} = \text{const at fixed } x, \quad (2A)$$

$$(x/x1)^a + (y/y1)^a = \{1 - (z/z1)^a\}^{b/a} = \text{const at fixed } z, \quad (2B)$$

$$(x/x1)^a + (z/z1)^a = \{1 - (y/y1)^a\}^{b/a} = \text{const at fixed } y. \quad (2C)$$

If the exponents, a and b, are both equal to 2, the shape functions are three-dimensional ellipsoids or two-dimensional ellipses. A general re-entry body shape is thus characterized parametrically by semi-axis lengths {x1, y1, z1, y2, z2, x3, y3, z3, x4, z4, x5, z5, x6, y6, x7, x8, y7, y8}, by exponents {a1, b1, a2, b2, a3, b3, a4, b4, a5, b5, a6, b6}, and where required by shifts in x-axis coordinate origins. Some of the semi-axis lengths and exponent parameters may vary with the coordinate x.

BRIEF DESCRIPTION OF THE DRAWINGS

FIGS. 13A-13C compare flow velocity and temperature versus distance from the surface (dn) and other flow variables for an optimized surface shape.

DESCRIPTION OF BEST MODES OF THE INVENTION

The present invention is a blunt body hypersonic atmospheric vehicle of a shape, derived from the COBRASQ parametric geometric class described in the following, which can be used in a multi-discipline optimization design method in a manner similar as described making use of said parametric geometric class of shapes. The particular parametric form or shape of the vehicle heat shield provides a motivation for the invention and meets the need for an optimizable shape with favorable aerodynamic and heating level properties.

The COBRASQ class of geometries is intended to generate an outer shape suitable for operation as a mid-L/D ratio, hypersonic reentry blunt body vehicle and is constructed using piecewise analytical surfaces or segments joined together with at least C1 continuity at definable seam lines. An exception to the C1 continuity condition is at the base seam, which need only be C0 continuous. At launch, the COBRASQ class of geometries is normally intended for its lengthwise x-axis to be aligned vertically coincident with the vertical launch axis of the launch vehicle. On atmospheric entry, the COBRASQ class of geometries are intended to be oriented at a substantial angle of attack α with the windward side (z>0) presented to the oncoming atmosphere.

Figure 2A:
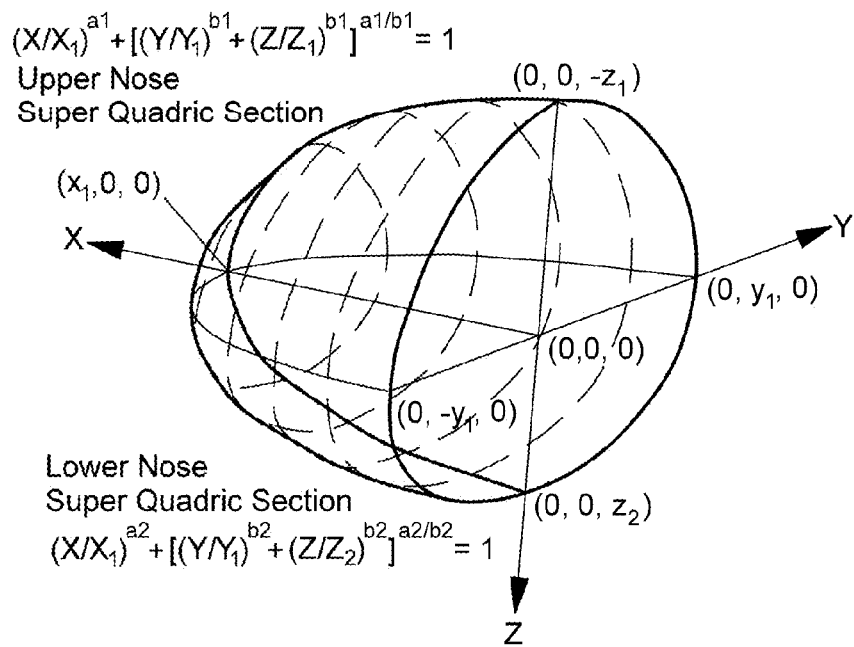
FIGS. 2A-2C illustrate the geometric shape parameters used to describe the different vehicle sections or views used in the invention.
Figure 2B:
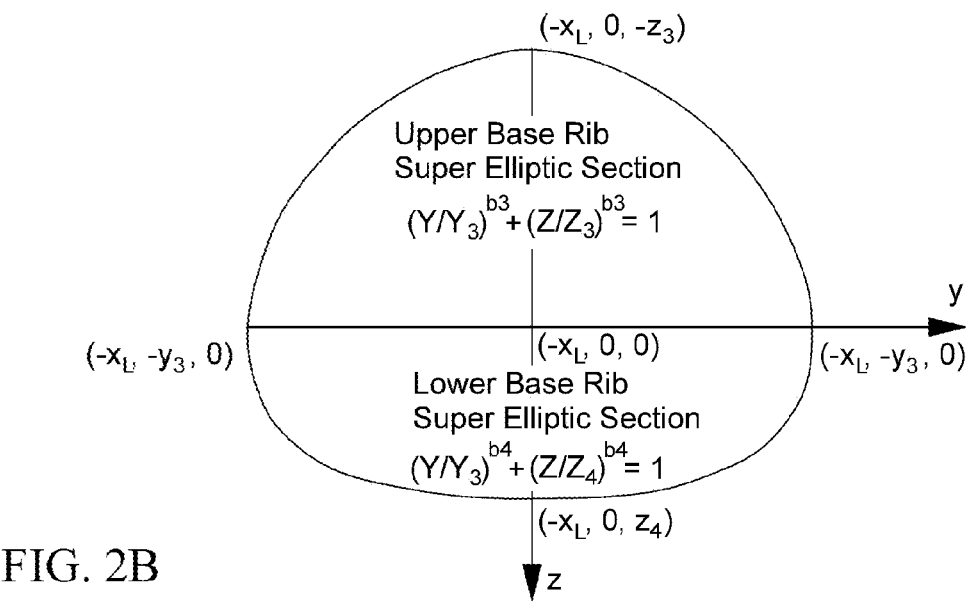
Figure 2C:
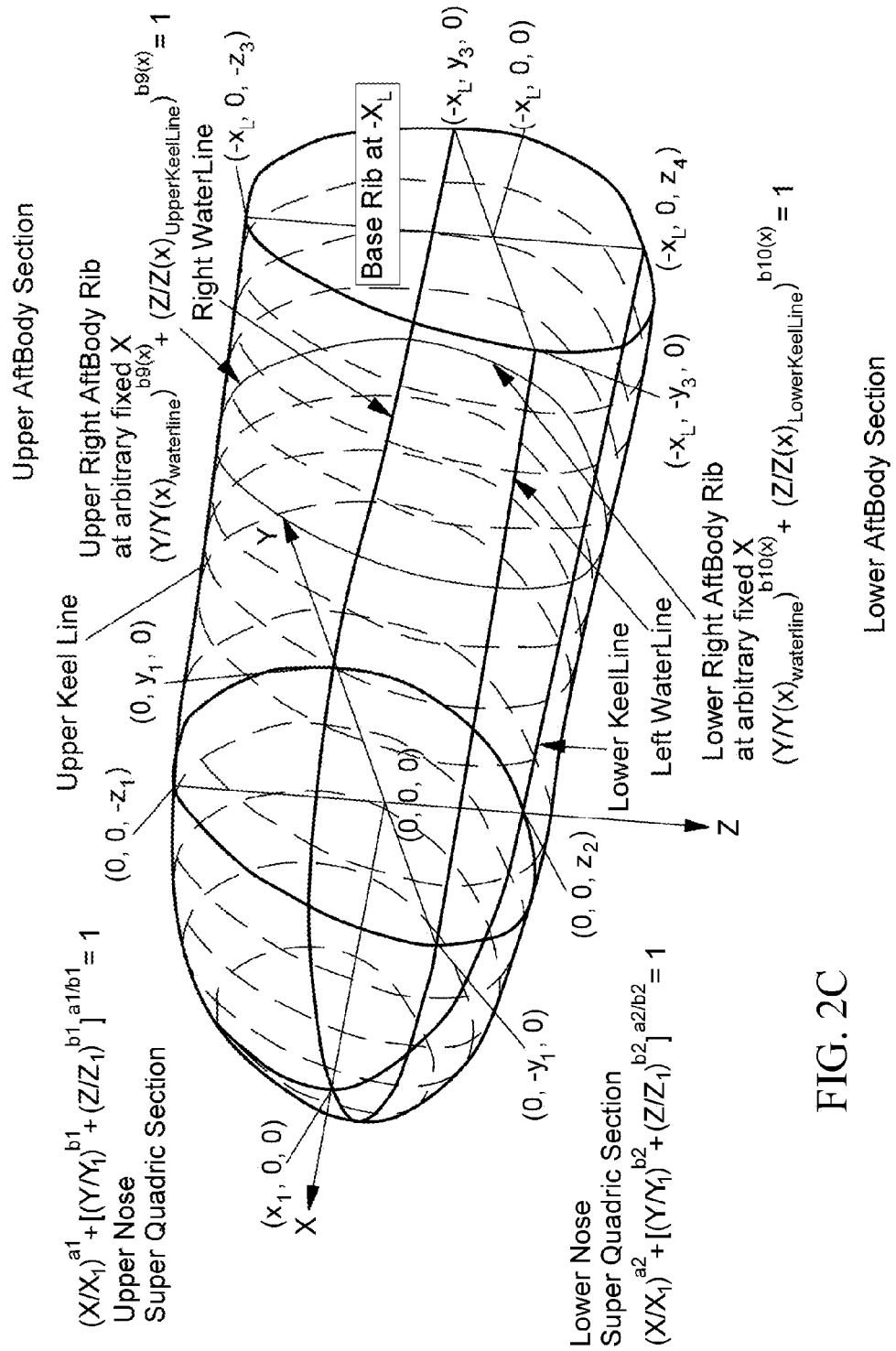

In FIGS. 2A, 2B and 2C, the geometries are illustrated along with Cartesian coordinate system (x,y,z). The x-axis is oriented along the lengthwise axis of the vehicle with the nose being in the positive x-direction and the aft-body and base being oriented towards the negative x-direction. The positive y-axis is oriented toward the right of the vehicle (facing forward), and the positive z-axis is oriented so the vehicle is pointed in what will generally be the windward direction when the vehicle is at a positive angle-of-attack (AoA).

Figure 1A:
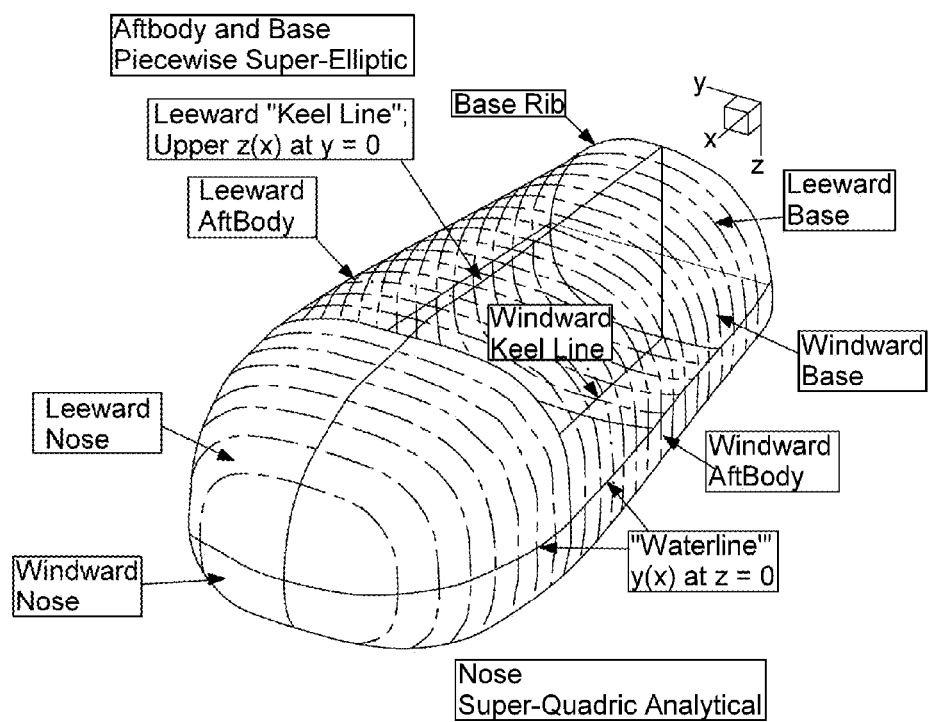
FIGS. 1A, 1B and 1C illustrate a COBRASQ class blunt body surface used for analysis according to the invention, in perspective, top and side views, respectively.
Figure 1B:
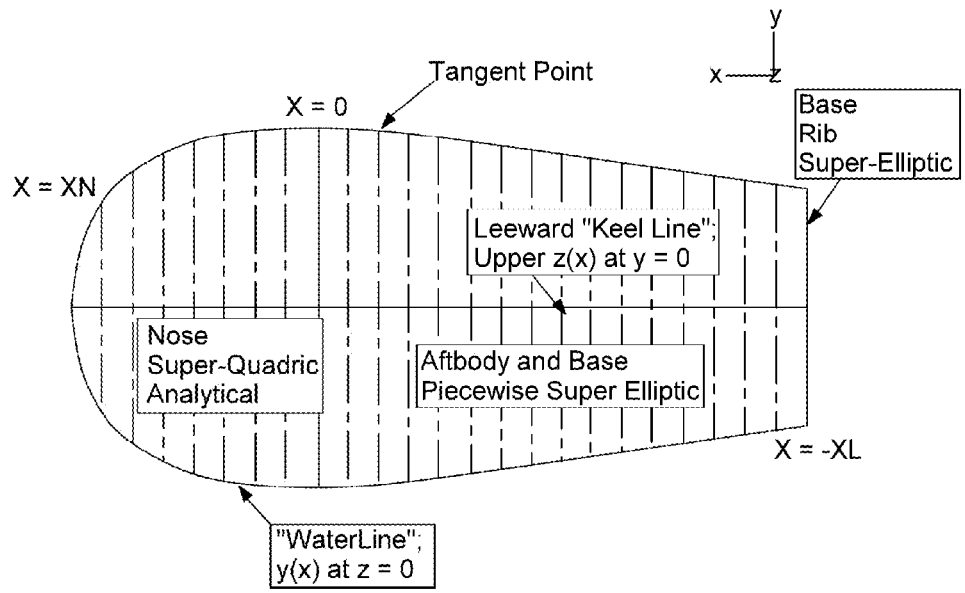
Figure 1C:
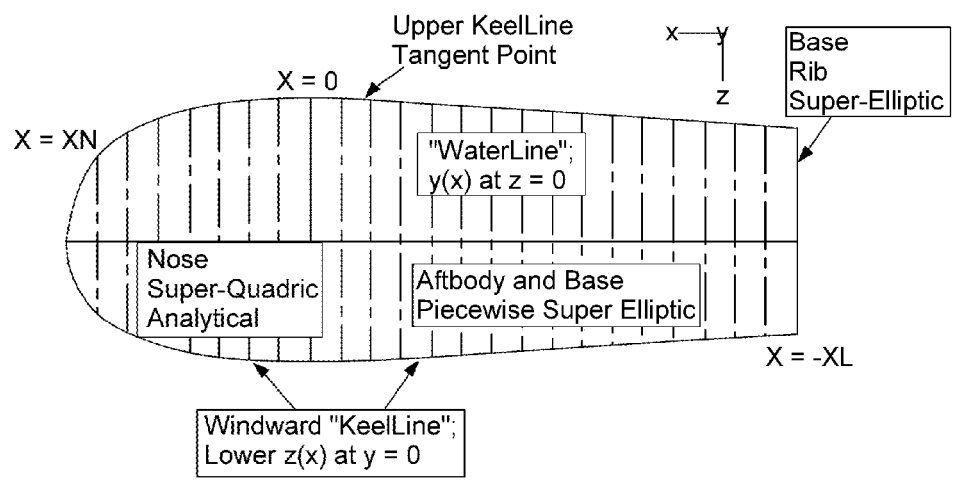

The vehicle shape is shown in FIGS. 1A, 1B, 1C, as composed of the several surface and seam line segments:

a. Windward Forebody or Nose section (z>0, and approximately x>0), b. Leeward Forebody or Nose section (z<0, and approximately x>0), c. Windward Aftbody Section (z>0, and approximately x<0), d. Leeward Aftbody Section (z<0, and approximately x<0), and e. Base Rib Section, being the rib section or yz-plane cut of constant x at the most rearward location (x=−$x_L$).

The Seam lines where these segments join are:

1. Fore/Aft Seam (at approximately x=0),

2. Waterline Seam, defined at z=0, for regions with z>0 being windward sections, and z<0 being leeward sections;

3. Upper or Leeward Keel or Spine, defined as the curve or line segments at y=0 for regions with z<0; and 4. Lower or Windward Keel or Spine, defined as the curve or line segments at y=0 for z>0.

The surface segments can be described by a collection of super-quadric surfaces, with the curve seams being defined by a collection of curve segments, either linear or curvilinear.

Figure 3A:
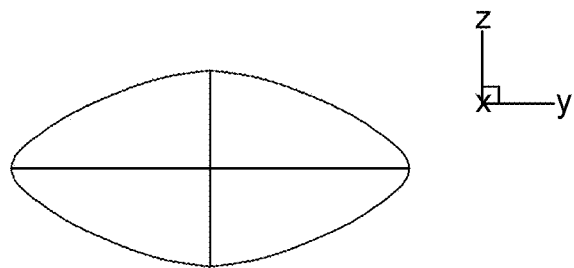
FIGS. 3A-3C illustrate super-quadric surfaces in a plane with exponents a=b=1.5, a=b=2.0 and a=b=2.5.
Figure 3B:
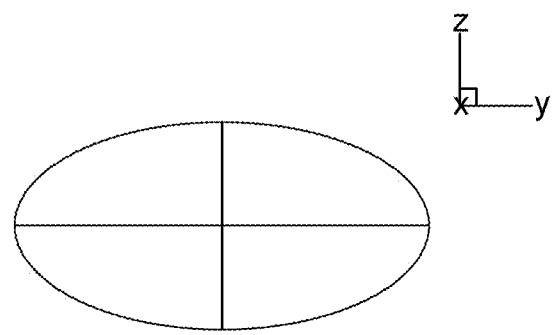
Figure 3C:
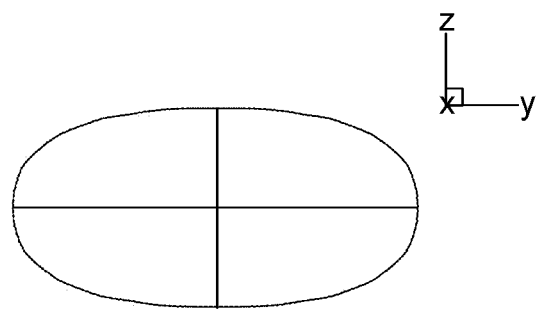

Without loss of generality, in a preferred embodiment, the upper Nose section (FIG. 2A), both windward and leeward, is defined by a super-quadric of the following form:

$$(x/x1)^{a1}+\{(y/y1)^{b1}+(z/z1)^{b1}\}^{a1/b1}=1, \quad (3)$$

where x1, y1 and z1 are specified semi-lengths and a1 and b1 are specified exponents, both greater than 1. FIGS. 3A, 3B and 3C graphically illustrate a two-dimensional representation of a super-quadric with a=b=1.5, 2.0 (ellipse) and 2.5 for comparison. In FIG. 2A, the lower Nose section is similarly defined as $$(x/x2)^{a2}+\{(y/y2)^{b2}+(z/z2)^{b2}\}^{a2/b2}=1, \quad (4)$$

where x2=x1, y2=y1, and a2=a1 (>1) are required for C1 continuity, and z1 and z2 are independently specified semi-lengths, and b1 and b2 are independently specified exponents, greater than 1.

The origin of the super-quadric is positioned at (x,y,z)=(0,0,0) with the most forward point on the nose section being at (x1,0,0). Each of the upper and lower Nose sections thus defined is symmetric about the xz-plane. Where the exponents, a1, b1, a2 and b2, are all equal to 2.0, and x1=y1=z1=x2=y2=z2, a simple hemispherical nose is obtained as a geometrically degenerate case.

The upper base rib (located at $x=-x_L$), is a super-quadric planar surface, as shown in FIG. 2B and defined by:

$$(y/y3)^{b3}+(z/z3)^{b3}=1, \quad (5)$$

where y3 and z3 are specified semi-axis lengths of the body surface in the yz-plane, and the specified base exponent b3 is also specified but must be >1. The lower base rib (located at $x=-x_L$), is a super-quadric planar surface, as shown in FIG. 2B) and is similarly defined by:

$$(y/y4)^{b4}+(z/z4)^{b4}=1. \quad (6)$$

The origin of the base rib is located at $(x,y,z)=(-x_L,0,0)$, and for continuity y3=y4, but z3 and z4 and b3 and b4 may be specified independently. The geometrically degenerate case of a circle is obtained with y3=z3=y4=z4 and b3=b4=2.

To define the aft-body region between the (upper/lower) Nose section and the (upper/lower) Base Rib section, both the Waterline curve segment and the (upper/lower) Keel curve segments must first be defined.

The Waterline curve segment is shown in FIG. 2C as an xy-planar cut through the vehicle shape at z=0. In the preferred embodiment, the Water line will be a continuous concatenation of at least two surface segments, defined by $$(x/x5)^{a5}+(y/y5)^{a5}=1, \text{for } x \geq x(\text{WaterlineTangent}Pt), \text{with } z=0 \quad (7)$$

$$y=y6(x), \text{for } x<x(\text{WaterlineTangent}Pt, \text{with } z=0, \quad (8)$$

where the first Waterline curve segment, Eq. (7), for x>x (WaterlineTangentPt) is a super-quadric segment contribution from the Nose super-quadric, and the second Water line curve segment, Eq. (6), for x<x(WaterlineTangentPt), is a linear segment (or spline segment, if desired) that is constructed to be tangent to the Nose super-ellipse and passes through the Base Rib at (x=−xL, y3, 0). The tangent point, at x(WaterlineTangentPt), can be found analytically or by iterative numerical means. Thus, the Waterline segment can be found at any x-station as given above and will be referred hereafter by the general equation, y(x,z=0)=yWaterLine(x).

The upper and lower Keel lines are treated similarly to the Water line and are shown in FIG. 2C, which shows sectional views from a xz-planar cut through the vehicle shape at y=0, each cut being composed of a continuous concatenation of at least two segments. The upper Keel line segments are defined by $$(x/x7)^{a7}+(z/z7)^{a7}=1, \text{for } x>x(\text{UpperKeelTangent}Pt), \text{with } y=0, z>0 \quad (9)$$

$$z=z7(x), \text{for } x<x(\text{UpperKeelTangent}Pt), \text{with } y=0, z>0 \quad (10)$$

and the lower Keel line segments are defined by $$(x/x8)^{a8}+(z/z8)^{a8}=1, \text{for } x>x(\text{LowerKeelTangent}Pt), \text{with } y=0, z<0 \quad (11)$$

$$z=z8(x), \text{for } x<x(\text{UpperKeelTangent}Pt), \text{with } y=0, z<0 \quad (12)$$

where the first curve segment for each of the upper and lower Keel lines (Eqs. (7) and (9), respectively) is a super-quadric segment contribution from the Nose super-quadric and the second curve for each of the upper and lower Keel lines (Eqs. (8) and (10), respectively) are straight lines (or splines, if desired) that are constructed to be tangent to the super-quadric Nose segment and to pass through the Base Rib segment at (−xL,0,−z3) and (−xL,0,z4), respectively. The exponents a5, a7 and a9 will all be equal to a1, the parameters x5, x7 and x9 will all be equal to x1, and the parameter z7 and z8 will be equal to z1 and z2, respectively, as these correspond to contributions from the Nose segment(s).

The tangent point location(s), expressed as x(WaterlineTangentPt), x(UpperKeelTangentPt), and x(LowerKeelTangentPt) are found by analytical or known iterative numerical methods to enforce at least C1 continuity for the Waterline, Upper Keel line and Lower Keel line.

Thus, the (upper/lower) Keel-line segments can be found at any x-station as given above, and will be defined hereafter by the general equations $$z(x,y=0)=z(\text{UpperKeelLine}(x)), \text{for } x1>x>-x_L, \text{and } z<0, \quad (13)$$

$$z(x,y=0)=z(\text{LowerKeeLine}(x)), \text{for } x1>x>-x_L, \text{and } z>0. \quad (14)$$

The Aft-body, shown in FIG. 2C, is specified for each point on the surface by the following procedure. For the Aft-body, at any given x-station, the yz-cut through the vehicle shape will be given by an upper and lower super-equadric rib defined by $$\{(y/y(\text{Waterline}(x))^{b9(x)}+(z/z\text{UpperKeelLine}(x)\}^{b9(x)}=1, \quad (15)$$

$$\{(y/y(\text{Waterline}(x))^{b10(x)}+(z/z\text{LowerKeelLine}(x)\}^{b10(x)}=1, \quad (16)$$

where the exponents b9(x) or b10(x) are found by any known continuous curves (spline, cosine, or linear) segments passing from b10(x)=b1 at the greater x-value of x(WaterlineTangentPt) and x(UpperKeelTangentPt), and b9(x)=b3 at $x=-x_L$. Similarly, the exponent b10(x) is found by any known (spline, cosine or linear) continuous curve segments passing from b1(x)=b1 at the greater x-value of x(WaterlineTangentPt) and x(LowerKeelTangentPt), and b10(x)=b4 at $x=-x_L$. The vehicle is symmetric about the xz-plane at y=0.

Using the above procedure at any x-station, each rib or (x,z) curve of the Aft-body can be described entirely and without ambiguity, and such a vehicle shape is C2 continuous, except at the seam lines given above, where it is C1 continuous. In the preferred embodiment described above it appears sufficient to specify the parameters, {xL,x1-x10, y1-y10,z1-z10, a1-a10, b1-b10} to entirely determine the vehicle shape. All other parameters mentioned in the description of the preferred embodiment may be derived during execution of the procedure described above.

A Fortran-based COBRASQ.F program implements the preceding procedure and provides a surface grid, as either a structured Plot3D ASCII text file, or as an unstructured surface mesh file suitable for with the CBAero engineering analysis program, or as an unstructured Tecplot ASCII text file suitable for plotting, using commonly available visualization software such as either Plot3D or Tecplot.

Such a surface grid can be generated with human intervention or without human intervention by means of a Multi-discipline Design Optimization procedure by providing a limited number of intuitive parameters, such as for a shape symmetric about the yz-plane. Although the number of surface segments discussed in the preceding is 6, the vehicle surface may be defined more generally by M surface segments, with $M \geq 1$.

For this particular instance of the invention (with M=6), a minimum of 15 independent parameters define the vehicle shape from which surface grids can be automatically generated. This number of independent parameters may be large or smaller than 15, depending upon the number M of surface segments.

Such surface grids can also be used with engineering-fidelity analysis codes such as CBAERO to provide wall pressure and heating, hypersonic aerodynamic properties such as lift and drag and stability, and structural codes such as MSC NASTRAN to provide structural strength and mass estimates of such a body, or to provide a basis for generating volume grids capable of use with hi-fidelity Real-Gas Navier-Stokes fluid mechanics and chemistry codes such as DPLR.

Note that, as shown in FIGS. 3A, 3B and 3C, when the super-quadric exponents, a and b are equal to 2.0, an ellipse is formed; whereas when a and b are less than 2.0 and near 1.0, the cross-sectional shape generated approaches a rhombus; and if they are much greater than 2.0, the cross-sectional shape becomes increasingly rectangular. As a consequence, a large class of practical 3D shapes, suitable for study as possible hypersonic re-entry vehicles, can be configured by means of the above sets of geometric parameters and methods.

The general parametric shape of the present invention defines the vehicle shape without the need for intense human labor, which allows for automated optimization or search throughout a large variety of possible shapes in order to find the best aerodynamic, aerothermal properties, including stability, lift, drag, both convective and gas-phase radiation heating.

The disclosed Multi-disciplinary Design Optimization (MDO) framework takes account of the aeroshell shape, trajectory, thermal protection system, and vehicle subsystem closure, along with a Multi Objective Genetic Algorithm (MOGA) for the initial shape. This is accomplished using a combination of engineering and higher-fidelity physics-based tools along with optimization methods and engineering judgment. This process demonstrates that the proposed family of optimized medium L/D aeroshell shapes exhibits a significant improvement over the present art. Further, a trade-off between the vehicle TPS and structural mass is identified for these aeroshell shapes and their corresponding vehicle trajectories which yields an overall decrease in total vehicle mass, or a corresponding increase in delivered payload, as compared to the state of the art.

As an entry vehicle's aeroshell becomes larger, the Reynolds Number (Re) increases, causing the flow to become turbulent. Studies have shown that the legacy Viking 70-degree sphere-cone aeroshell shape, classically used for entry into Mars, exhibits high turbulent heating levels on the leeward side as well as early transition to a turbulent flow for large diameters. This phenomenon has especially impacted the planned Mars Science Laboratory (MSL) aeroshell, also a 70-degree sphere-cone shape, which is predicted to experience a peak margin heating rate approaching 200 Watts/cm$^2$ during entry. This maximum heating occurs on the leeward side of the fore-body aeroshell, and reaches heating augmentation levels up to a factor of six higher than laminar heating levels rather than the expected turbulent heating increase by a factor of three. This high leeward side aeroshell turbulent heating has been attributed [1,2] to entropy layer swallowing effects associated with the legacy 70-degree shape at high Reynolds number, Mach number and angle of attack. The high turbulence-induced heating rates on the MSL aeroshell were a primary reason that the MSL program changed its thermal protection system (TPS) material from lighter SLA-561V to more robust PICA in 2008. The PICA material, in one embodiment, is described in U.S. Pat. Nos. 5,536,562, 5,672,389 and 6,955,853, issued to Tran et al and incorporated by reference herein.

The aeroshell shape affects several primary design areas for hypersonic entry vehicles. This includes the aerothermal environment which determines vehicle's TPS layout and design, the aerodynamics which affects deceleration and maneuverability coupled with trajectory shaping and the aerodynamic loading which affects the underlying structural subsystem. Because of this, it is crucial that alternate aeroshell designs account for these multiple disciplines in order to evaluate them in a system level view and to understand how each subsystem is affected. In order to do this and to explore the design space, an integrated Multi-disciplinary Design Optimization (MDO) technique accounting for shape, trajectory, thermal protection system (TPS), and vehicle closure was utilized in this effort. A combination of engineering and higher-fidelity physics analysis tools along with optimization methods and engineering judgment is used to accomplish a system level view and lead to a multi-discipline solution. The integrated MDO process environment allows engineers to efficiently and consistently analyze multiple design options. In addition, this integrated MDO framework allows for assessing the relative impacts of new discipline tool capabilities and identifying trade-offs between multiple objectives through the use of the Genetic Algorithm (GA) optimization Pareto front. The framework described is referred to as COBRA, an acronym for "Co-Optimization of Blunt-body Re-entry Analysis"[3].

Vehicle Geometry.

The vehicle geometry is based on one of several FORTRAN codes written specifically to provide an analytic description of the vehicle shape with a small number of geometric parameters. Shape examples are shown in FIGS. 1A-1C.

These codes that can be used to define a geometry include: 1) a low-L/D, high-ballistic coefficient symmetric/asymmetric capsule body code [4,5]; 2) a medium L/D lifting body code as described above, or 3) a low-L/D, Apollo/CEV-type truncated-sphere/torus capsule shape code. Each code can generate surface mesh descriptions in either structured Plot3d or as unstructured triangulations of the surface shape. These codes allow the use of a small set of geometric parameters to define the vehicle's outer mold line (OML) and to provide shapes with a range of aerodynamic and aerothermodynamic properties useful for optimization. The general parametric shapes of the COBRA process entirely define the vehicle shape without the need for intense human interaction. This reduction in direct interaction allows for automated optimization within a large design space to find the best combination of aerodynamic stability and aeroheating for the vehicle performance.

Aerodynamics/Aerothermodynamics.

The aerodynamic and aerothermodynamic characteristics of each particular vehicle shape are computed using either the CBAERO engineering code [6] and/or the DPLR [7] Computational Fluid Dynamic (CFD) code. CBAERO is an engineering analysis code based on independent panel methods, such as the modified Newtonian method, along with a surface streamline algorithm and an extensive set of validated engineering correlations to determine surface pressure, convective and radiative heating, shear stress, and boundary layer properties. DPLR is a high-fidelity, physics-based real-gas Navier-Stokes code used in conjunction with NEQAIR [8], a high-fidelity radiation code, to give results either in support of or in place of CBAERO data.

It is in this discipline that a hybrid approach which leverages high fidelity analyses with engineering methods using sophisticated interpolation techniques, ("anchoring"), is utilized. Traditionally, analytical tools applied in the early phases of vehicle design rely on engineering methods because of their rapid turnaround time, ease of use, and robustness. The drawbacks of engineering methods are that such methods only approximate the physics governing the process to be modeled and such methods may not accurately model the flow physics. Unlike engineering methods, high fidelity methods are based on solutions to the basic equations of physics to be modeled and yield more accurate results, if used within their limitations. However, these high fidelity methods tend to be difficult to set up and computationally expensive (typically hundreds of times more CPU-intensive than engineering methods). The anchoring approach addresses the deficiencies with the engineering and high fidelity methods by utilizing a rapid and intelligent engineering-based interpolation method. Further detail of this anchoring approach can be found in Reference [9].

Trajectory Analysis.

During optimization of the vehicle, the nominal design trajectory is dependent on the aerodynamic and aeroheating properties of the particular vehicle shape, in particular, L/D, ballistic coefficient, and peak heating. Constraints on the trajectory flight dynamics, such as gravitational loading on the vehicle, also must be imposed. To find a nominal trajectory for each vehicle under consideration, the Program to Optimize Simulated Trajectories (POST2) [10] code is used.

In this work, the trajectory used for entry and landing on a surface of a planetary body consists of two phases: (1) an initial aerocapture phase to decelerate the entry vehicle into a 1-SOL orbit about the Martian atmosphere; and (2) an entry phase down to the surface. Both trajectories are modeled with 3DOF. POST2 is wrapped inside the COBRA environment to expose input parameters necessary to simulate the aerocapture and entry trajectories. By exposing a limited set of input variables from POST2, the trajectory wrapper greatly simplifies the tedious work for the analyst and makes it suitable for integrations into the COBRA environment. However, it does not replace critical expert judgment. Results should be carefully inspected to ensure correctness. The wrapper also exposes output variables needed for downstream tools such as TPS sizing, structure, and the weight and sizing closure tools.

Structure Analysis.

In performing conceptual design on a vehicle that does not closely resemble one which has flown before, or that has undergone higher fidelity analysis, it can be difficult to develop appropriate mass predictions for the vehicle components. One component which is very sensitive to the vehicle configuration is the structure of the aeroshell. The structure mass is determined, not only by the aeroshell configuration, but also by the aerodynamic loading, vehicle scale, and payload configuration. This presents a serious problem when performing a design space exploration or stochastic optimization where the configuration of the conceptual vehicle is allowed to vary largely. Traditionally, the options available are: (1) to apply existing Mass Estimating Relations (MERs), (2) to extrapolate from similar vehicle designs, and (3) to select a general vehicle configuration and generate a parameterized mass model to be used in the analysis. In some cases these approaches are suitable. However, there are situations when there are no MERs available for a given configuration, or the existing ones have to be extrapolated to such an extent that their associated error is either unknown or unacceptable. In many cases, larger margins are applied to the structures, making the structures infeasible as far as mass is concerned. To address these issues, in this work, a structure module has been developed to allow for direct simulation and optimization of the vehicle structure components using automated scripts. This is done by extracting the pressure load from the engineering aerodynamic tool, assigning structure elements for each aeroshell shape, and performing a structural optimization to minimize the structural subsystem mass using MSC NASTRAN [11].

Thermal Protection System Sizing.

To assess the thermal protection system (TPS), the nominal trajectory for each shape is generated and its aerodynamic and aeroheating characteristics, including the time history of the heating environments, are provided to the TPSSIZER [12] set of programs. TPSSIZER includes the FIAT [13] thermal analysis code for ablative TPS materials. The result is an optimized TPS sizing for a vehicle shape with its own nominal trajectory for the mission constraints being considered. The TPS sizing process begins by computing the maximum temperature and integrated heat load for each point on the surface of the vehicle. This is done by simulating flight by each surface geometry through the aerocapture, cool-off, and entry trajectory phases, by interpolating in Mach number, dynamic pressure, and angle-of-attack within the CBAERO aerothermal database at each trajectory time step. Appropriate design margins are applied to the heating rates based on those developed for the NASA Orion capsule [14]. The TPS material distribution is determined by the maximum heating/temperature for each body point. Approximately 10 to 20 TPS sizing points are selected for each body region based on maximum integrated heat load values. Detailed heating environments as a function of time are generated for the TPS sizing body points. For each TPS sizing point, the corresponding thermal analysis material stack-up is created, reflecting the TPS material concept and the associated aeroshell structural definition, and including sublayer material thicknesses determined by the structural analysis. At each sizing point, a transient heat transfer analysis is computed that varies the insulation thickness until the desired back wall temperature limit is satisfied. This process is repeated for all body TPS sizing points and the TPS mass is computed assuming uniform insulation thickness over each body zone.

Vehicle Mass and Sizing.

Among the constraints for optimization of a mission being considered are the particular launch vehicle, payload fairing, and delivered vehicle total mass at entry interface for the planetary body of interest. Combining the TPS sizing obtained from TPSSIZER and the propellant mass estimate for the trajectory tool POST2, the weight/sizing vehicle closure analysis code, XWAT/XClosure [15] provides an estimate of the delivered payload for the particular vehicle shape parameters selected by the MDO analysis. XWAT, the XML based Weight/Mass Analysis Tool, is an XML based C++ application to compute mass/sizing of any space vehicle concept. XWAT can be applied, not only to launch vehicles, but also EDL studies. For our study, the MER's and associated parameters for all the major subsystem elements are collected in an XML format within the LVL framework. Several of the subsystem MER's depend on the total entry mass, resulting in an implicit dependence. XWAT tries to solve a fully nonlinear mass equation system by iterating on the total entry mass until the masses of all the subsystems converge. Upon convergence, XWAT produces a mass and volume statement for the closed configuration. In this work, the payload mass is prescribed and the total entry vehicle mass is computed using the XWAT program. Optimization of either the maximum delivered payload or the minimum entry vehicle mass (where a payload is specified), becomes an objective function for the COBRA MDO environment.

Shape Optimization.

Shape optimization is performed using a Multi Objective Genetic Algorithm optimization (MOGA) package within the DAKOTA tools suite [16]. The basic idea associated with a genetic algorithm ("GA") approach is to search for a set of optimal solutions using an analogy to the theory of evolution. The problem is parameterized into a set of design variables, also referred to as "genes." Each set of design variables that fully defines one design is called a design or a chromosome. A set of chromosomes is called a population or a generation. Each design or chromosome is evaluated using a fitness function that determines survivability of that particular chromosome. In this invention, the genes are a series of geometric parameters associated with the aeroshell outer-mode-line (OML) and are optimized to meet two thermal objectives. Each evaluation is performed at a single trajectory point based on what is expected to be the maximum heat flux experienced by an entry vehicle into Mars. This maximum heat flux for the baseline 10×30 simple Ellipsled has been determined to occur during the Aerocapture trajectory phase at a Maxh number of approximately 32.0 and dynamic pressure of 0.15 bars. The GA function evaluation is performed at the flight conditions set forth in the preceding for a vehicle trim alpha design such that its aerodynamics achieves a lift-to-drag ratio of 0.5.

The two objectives are (1) to minimize the peak total heat flux on the vehicle and (2) to maximize the drag area ($C_DA$). Maximizing CdA leads to a minimization of ballistic coefficient. During solution advancement, each chromosome is ranked according to its fitness. The higher-ranking chromosomes are selected and continue to the next generation. The newly selected chromosomes in the next generation are manipulated using various operators (combination, crossover or mutation) to create the final set of chromosomes for the new generation. These chromosomes are evaluated for fitness and the process continues until a suitable level of convergence is obtained.

Constraints are included in the GA optimization approach, either by direct inclusion into the objective function definition as penalty constraints, or by including them into a fitness function evaluation procedure. For example, if a design violates a constraint, its fitness is set to zero, and the design does not survive to the next generation. Because GA optimization is not a gradient-based optimization technique, it does not need sensitivity derivatives. GA theoretically works well in non-smooth design spaces containing many local minimums and maximums. General GA details, including descriptions of basic genetic algorithm concepts, can be found in References [18] and [19].

Summaries of some of the computer codes (COBRASQ, CBAERO, DPLR, POST2, 3DOF, TPSSIZER, FIAT, MER, MSC NASTRAN, XWAT/XClosure, EDL-SA and ADB) used here are contained in an Appendix. Alternate MDO algorithms, as known to the practitioners of the art, can be substituted for the GA optimization algorithm.

MDO Overview.

An overview of the COBRA integrated system optimization analysis environment based on the discipline tools discussed above is illustrated in FIGS. 2A-2C and 3A-3C. The COBRA environment, as configured, allows for either a top down approach to determine the maximum landed payload mass for a given entry total entry vehicle mass, or a bottom up approach to determine the required entry vehicle mass for a given landed payload. Here, a bottom up approach is used where the landed payload required is specified, and the co-optimization process is to minimize the entry vehicle mass at atmospheric entry.

The global system optimization is achieved through a multistep process. The MOGA driver is used to find a Pareto front among the allowed range of vehicle shape parameters being considered using engineering fidelity analysis tools to explore the initial vehicle shape design space. This is followed by an integrated MDO analysis including structures, trajectory, and TPS sizing, followed by a weight and sizing analysis to perform the final vehicle closure.

COBRA Environment Calibration/Verification.

Because of the complexity of integrating the MDO analysis, it is critical that experts in different disciplines are involved in both the setup and verification of the results being generated. For our work we selected the EDL-SA rigid aeroshell Architecture 1 as described in Reference [20] as the point of departure (POD) for our baseline. Under the EDL-SA, multiple architectures are explored. The rigid aeroshell configuration was based on a vehicle with an outer model line (OML) shape including a 5-meter radius hemispherical nose with a cylindrical aft-body of diameter 10 meters and length of 25 meters yielding a total vehicle length of 30 meters, referred to in our work as the 10×30 Ellipsled. This process provides a means to allow us to perform a verification analysis and to setup and calibrate the trajectory and MERs for the chosen baseline. Each of the technical discipline analyses is performed independently on the baseline configuration and the results are compared to values reported in [20]. This process is also used to provide a point of departure (POD) for the aeroshell shape optimization and the subsequent integrated system analysis.

10×30 Ellipsled High FidelityPOD Comparison of Engineering Aero/Aerothermal.

Figure 4A:
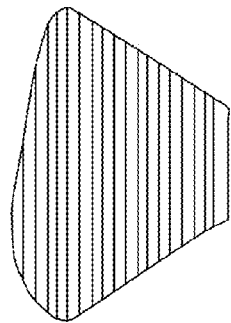
FIG. 4 illustrates different exemplary re-entry vehicle shapes.
Figure 4B:
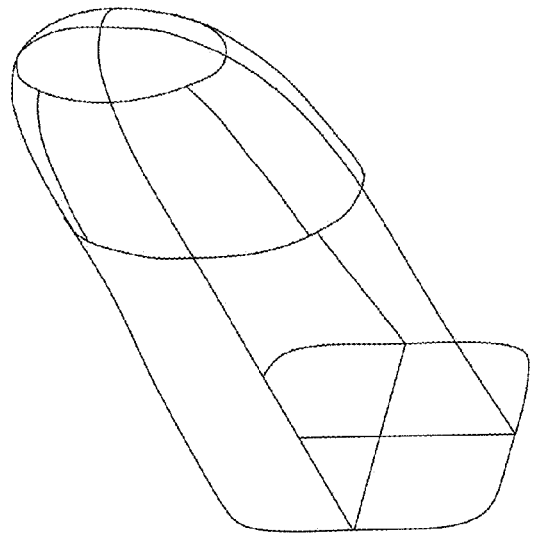
Figure 4C:
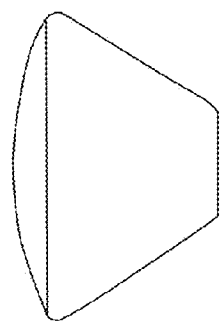

To assess the accuracy of the CBAERO engineering tool, the aerodynamics and aerothermal heating on our POD architecture must be evaluated. To accomplish this, a comparison of the surface pressure, surface temperatures and convective heating is performed against a high fidelity DPLR simulation as shown in FIG. 4. This comparison is performed at a Mach number of 32.5, dynamic pressure of 0.114 bar, and angle-of-attack of 56.4 degrees. These qualitative comparisons illustrate that the engineering CBAERO results compare well with DPLR for this geometry.

Figure 5:
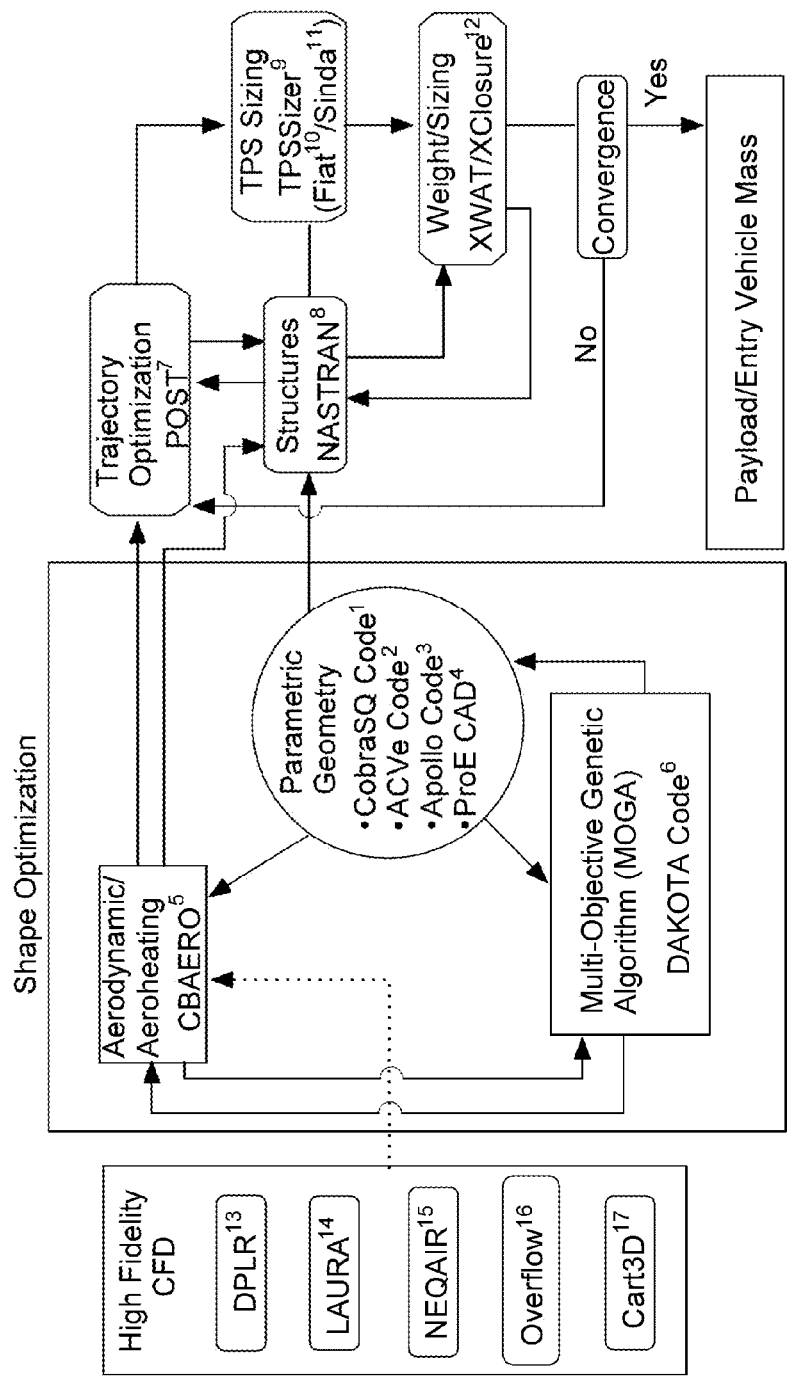
FIG. 5 briefly illustrates an MDO Cobra analysis process.

FIG. 5 illustrates a system for practicing the invention.

10×30 Ellipsled POD Trajectories.

The trajectory is divided into energy phases using the initial and final energy states. In the COBRA environment, POST2 modulates the bank angles to achieve the final conditions while trying to satisfy a set of constraints. The aerocapture trajectory is formulated as a targeting problem. For this work, the entry trajectory is run with a reference stagnation heat load minimization option. Other options include: maximizing the landed mass, or optimizing a user defined variable through a generalized table. The aerocapture trajectory can also be constrained with specified minimum altitude, maximum g-load, and maximum heat flux. The entry trajectory is constrained with maximum g-load, maximum heat flux, maximum q-alpha, freestream dynamic pressure and cross/down range to achieve the same retro rocket initiation as is utilized in the EDL-SA effort documented in Reference [19].

Table-1 presents the trajectory initial conditions and constraints obtained from EDL-SA Architecture 1 [19] for both the aerocapture to 1-SOL orbit and the entry trajectory from the 1-SOL orbit. The Entry from 1-SOL trajectory starts at the apogee with a de-orbit DV=15.309 m/s. A cool down period is allowed after capture into 1-SOL, but to save execution time, the un-powered entry trajectory begins at the entry interface and ends at the point when the Mach number reaches 2.67. Throughout the entry trajectory, bank modulation controls is performed to minimize the reference heat load. Four constraints are implemented for the trajectory design: 1) deceleration must be less than 3 Earth G values (3 $g_E$), 2) q-alpha must be less than 12,000 psf-degrees (575,000 Pascal-degrees), 3) down range must exceed 1220 km, and 4) free stream dynamic pressure at Mach number $M_{s1}$=2.67, for aeroshell ejection, must remain below 1240 Pascal. The vehicle free falls until Mach number $M_{s2}$=2.72 is attained. After meeting these constraints, the vehicle continues its final descent using retro rockets until touch down at an altitude of 885 m below MOLA with a relative touchdown velocity of 2.5 m/s. The retro rocket max thrust is 1,677,200 Newton.

TABLE 1

EDL-SA 1-SOL Trajectoires

|  | Aerocapture | Entry |
| --- | --- | --- |
| $M_{em}$ (kg) | 110,164 | 109,595 |
| Aeroshell Mass (kg) | 41,222 | 41,222 |
| L/D @ peak dyn. pressure | 0.5 | 0.5 |
| Ballistic Coef. (kg/m2) | 460 | 460 |
| E.I. Altitude (m) | 136,097 | 128,772 |
| E.I. Inertial Velocity (m/s) | 7,360 | 4,714 |
| Inertial F.P.A. (deg.) | −12.77 | −11.005 |
| Inertial Azimuth Angle (deg.) | 89.93 | 0.0004 |
| Max. G Constraint (Earth Gs) | 3 | 3 |
| Max. dynamic Pressure Constraint (Pa) | 10,600 | 10,700 |
| Retro Rocket ISP (sec) |  | 349.2 |
| Mach no. @ Retro Rocket |  | 2.7 |

An independent trajectory analysis is first generated using the aerodynamic and atmospheric data extracted from the EDL-SA baseline trajectories, referred to as "ARC" in FIGS. 7A-7D. This is done to calibrate our trajectory simulations in COBRA, through bank modulations, and to ensure that the trajectory module can produce similar trajectories as the EDL-SA baseline. The lift and drag coefficients are constructed as functions of the vehicle specific energy. The POST2 trajectory setup is configured in the integrated COBRA environment where it receives the aerodynamic data from CBAERO. Results of the POST2 trajectories are passed to, and used by, the downstream tools. FIGS. 7A-7D compare the 10×30 Ellipsled aeroshell shape trajectory with the EDL-SA trajectory, from NASA Langley Research Center (black lines), the calibrated trajectory (green lines), and the COBRA baseline trajectory (red lines). The aerocapture and entry trajectory are concatenated into a single trajectory. The 12 hours flight time for the entry trajectory from the apogee to the entry interface is not plotted.

Figure 7A:
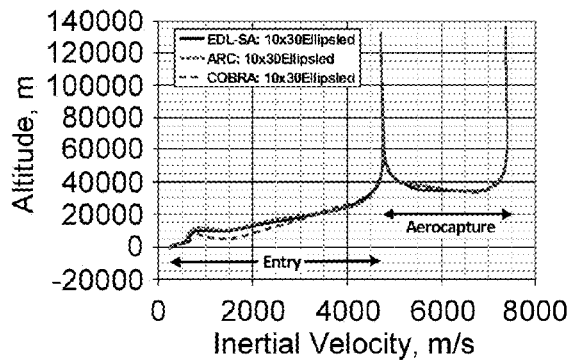
FIGS. 7A-7D graphically illustrate altitude versus velocity, and dynamic pressure, lift and drag coefficients versus time for a typical trajectory.
Figure 7B:
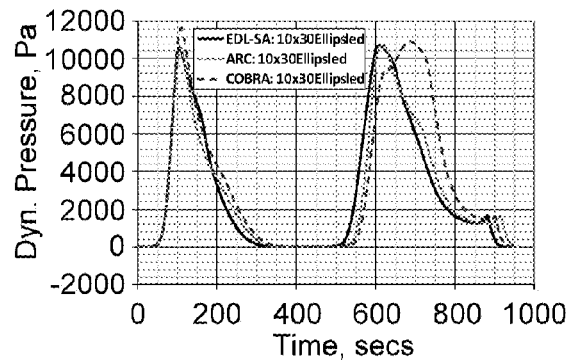
Figure 7C:
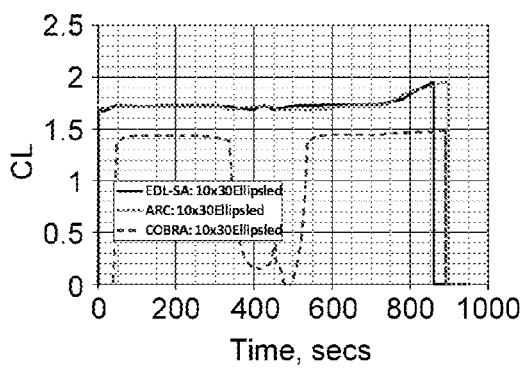
Figure 7D:
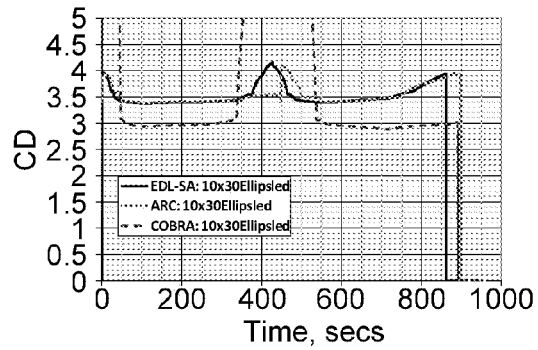

As shown in the plots in FIGS. 7C-7D, the integrated COBRA simulation for the 10×30 Ellipsled flies at approximately 12 percent lower drag and higher lift coefficient than that predicted by EDL-SA. However, both achieve the same lift-to-drag ratio but at different trim angles-of-attack. Hence, in order for the COBRA predicted trajectory to dissipate the same energy and permit capture into 1-SOL orbit or reach the surface, the trajectory dips lower into the atmosphere, resulting in higher free stream dynamic pressure and slightly less deceleration. It should be noted that the COBRA trajectory shows very low lift coefficients and high drag coefficients for an initial portion of a descent trajectory, where the vehicle experiences very low dynamic pressure and aerodynamic forces are negligible. These predictions are attributed to the very large viscous forces that the engineering tool predicts and which would be better evaluated with a free molecular flow computation. However, this will not affect the results of the trajectory, because the low dynamic pressure corresponds to low aero force.

10×30 Ellipsled POD Structures.

The structural module within COBRA is designed to generate a finite element (FE) model based on a user input file and a supplied surface mesh from the COBRASQ shape generation tool. The module is coded to generate a beam-stringer-skin type FE model. Using the input file, the user has control over parameters such as number and location of beam and longeron members, beam and longeron cross sections and materials, payload mass, distribution of mass over the vehicle structure, and even skin material and stackup for composite and laminate structures. The user selects from a series of analysis types including entry and/or launch analysis for a given configuration or a design optimization for either an entry load only situation or both launch and entry load cases. In an optimization run, the objective is to minimize the mass of the structure and the design variables are the dimensions of the beam member cross section and the laminate thicknesses in the stackup. The user has the option of selecting a single beam and longeron dimension to optimize (e.g., the height of an "I" beam) or any number of dimensions up to the maximum number that define a particular cross section. Further, the user has an option of dividing the vehicle into multiple zones that are optimized independently to produce a more optimized structure. On completion of the optimization run the mass of the structure is passed to XWAT, and the supplied stackup files for each zone are updated with the optimized thicknesses and passed on to the TPS sizing module allowing for a consistent structural stackup between TPSSIZER and MSC NASTRAN.

The structural optimization is performed using Solution 200 in MSC NASTRAN. This optimization was configured to yield the lowest structure mass while remaining within allowable stress and shear constraints. Most of the components in the model were constrained by their allowable stress. For this purpose, the A-Base values were used from the 1998 MIL Handbook. The only material not constrained by stress is a honeycomb material used in the laminate skin layup. For this material, the allowable shear is used to constrain the design and these properties were obtained from the Hexcel.com website.

Figure 8:
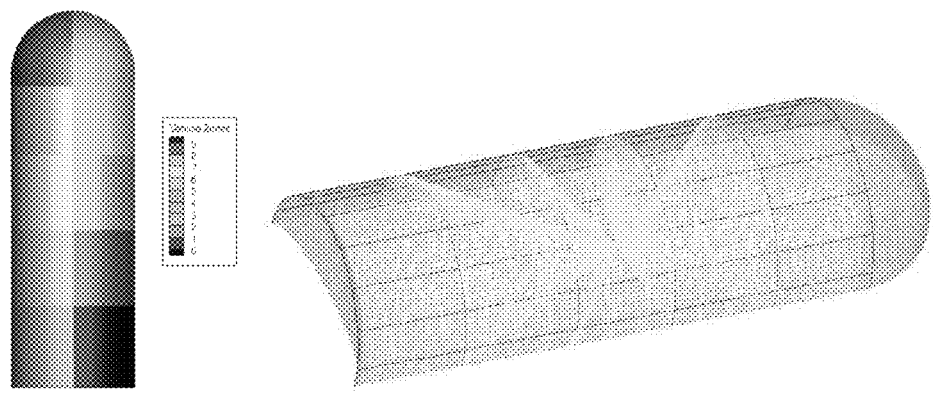
FIG. 8 illustrates zone assignments for a surface of a representative vehicle.

To verify how the POD structures architecture compares to that of the EDL-SA, a comparison case was run using the information that was available about the 10×30 Ellipsled's beam locations, and the assumed materials. The EDL-SA NASTRAN FEA model was divided into six longitudinal zones. For a comparable analysis we split our FEA model into six zones and obtain a mass of 1993 kg using aluminum beams and longerons and a composite laminate for the skin. Dividing the vehicle up differently may lead to a more optimal shape. By applying a ten-zone decomposition to the vehicle, as opposed to six zones (five windward zones and five leeward zones), as shown in FIG. 8, the optimized mass is brought down to 4333 kg.

10×30 Ellipsled POD Thermal Protection Systems Sizing.

Initially MER's were developed for the Thermal Protection System mass as part of the overall entry mass calibration process discussed in the preceding. The baseline TPS concept for the Mars EDL-SA vehicle consists of a dual-layer TPS concept, made up of an outer ablative TPS layer to accommodate the high heating rates encountered during the aerocapture phase, with a lighter weight sublayer TPS material to address the more benign aerothermal environments of entry. For the current shape optimization trade study, a more conventional single layer TPS concept was selected. This resulted in a simplification of the TPS design analysis by avoiding the complication of modeling the dual layer concept without impacting the relative comparison between the varying geometric configurations (effects of modifying the aeroshell shape to infer how it will affect the TPS mass).

The TPSSIZER code is used to conduct the TPS sizing for the entry vehicle. The TPS sizing trajectory includes the initial aerocapture phase concatenated with the 1-Sol entry trajectory, with an intermediate cool down period. This cooldown allows the TPS and structure to re-radiate the aerocapture heat pulse and return to the initial pre-entry temperature distribution. Due to the magnitude of the convective and shock-layer heating incurred during aerocapture, Phenolic Impregnated Carbon Ablator (PICA) is selected for windward applications, with Shuttle derived ceramic tile (LI-900) used on the cooler leeward surfaces.

For the baseline 10×30 Ellipsled configuration, the resulting TPS material distribution includes 493.7 m² of LI-900 tile and 527.3 m² of PICA. Maximum RSS PICA thickness is 14.8 cm, with an average a real thickness of 8.16 cm. Maximum thickness for the LI-900 tile is 3.37 cm, with most of the LI-900 tile at minimum gauge thickness. The TPS windward splitline and thickness distributions are shown in FIG. 7. Total LI-900 mass is 1170 kg, with an average areal unit mass of 2.37 kg/m² and total PICA mass is 12,188 kg, with an average areal unit mass of 23.11 kg/m². The net total TPS mass is 13358 kg with an average areal unit mass of 12.63 kg/m². This compares with a total TPS mass for the dual-layer concept, used by EDL-SA, of 9,217 kg at an areal unit mass of 8.96 kg/m². It should also be noted that the structural concept for the baseline EDL-SA Ellipsled is titanium skin-stringer with an allowable 560° K back-face temperature. By comparison, the POD Ellipsled aeroshell is composite honeycomb with an allowable maximum temperature of 450° K.

10×30 Ellipsled POD Entry Vehicle Mass Estimates.

The entry vehicle total mass was computed using Mass Estimating Relationships (MER's) developed at the major subsystem level for the 40 MT payload Ellipsled configuration, including structures, induced environments, DHCC, auxiliary systems (separation system), RCS, prime power generation and distribution, surface control actuation and RCS propellant. Fixed masses included the lander vehicle and payload. The form of the MER's was derived from Reference [20], with the leading coefficients calibrated to replicate the Mars EDL Architecture No. 1 subsystem weight statement [20]. Mass growth allowance of 15 percent was applied to all dry subsystem masses.

As an example, the aeroshell structural mass is estimated using the unit areal structural mass ($UWT\_Body_{REF}$) presented in Reference [20], with correlation parameters derived from the body length/body diameter trade-off study. Additional correlation parameters are applied to reflect variations in entry mass and aero-loading anticipated in the geometry trade/optimization process. The form of the aeroshell structural MER is:

$$UWT\_Body = UWT\_Body_{REF} * (L_B/L_{B\_REF})^{0.967} * (D_B/D_{B\_REF})^{-0.988}$$

$$*(m\_Entry * g_{MAX\_Lat}/(m\_Entry_{REF} * g_{MAX\_REF\_Lat}))^{0.23}$$

$L_{B\_REF}$=30 m $D_{B\_REF}$=10 m $m\_Entry_{REF}$=110100 kg $g_{MAX\_REF\_Lat}$=2.5 Earth g's)

$UWT\_Body_{REF}$=5.865 kg/m²

All of the "REF" values are taken from the reference Architecture No. 1 mass statement and associated trajectory. This form of the structural MER will return the reference unit areal mass with all the parameters set equal to the reference values. Within the shape optimization process, as the geometric parameters change, along with the associated change in the trajectories due to changes in the aerodynamic coefficients with the varied shape, the unit areal structural weight will vary to reflect the geometric and trajectory related parameter variations. This process is generally extended to the other major subsystems through the MER formulation (e.g. surface actuation mass, scaled with maximum free-stream dynamic pressure and body flap planform area).

Using the reference values for the Architecture No. 1 Ellipsled as inputs to XWAT, Table 2 compares the XWAT estimated entry mass with the values from Reference [20], as shown in the second column. The third column presents the XWAT mass estimation using the MER's for all subsystem masses. Ideally the subsystem and total masses should agree. However, differences in assumed parameters, slightly different WBS definition and the nonlinear nature of the MER's result in non-zero estimated mass differences. As an example, the maximum lateral g-load during entry is found to be 2.79 $g_E$'s, as compared to the value of 2.5 $g_E$'s used in Reference 19. The net result is the XWAT predicted aeroshell mass of 6129 kg, compared to 5980 kg from Reference [20]. Finally, the overall difference in estimated entry vehicle mass is approximately 1 percent.

The next step in the analysis process replaces the XWAT MER's for body structure and TPS with the integrated COBRA tools discussed above and re-closes the vehicle. The resulting subsystem masses and vehicle total entry mass are presented in column 3 of Table 2. The TPS mass has increased, reflecting the effects of not using the lighter weight dual-layer TPS system used by the EDL-SA baseline configuration. However, some of this mass increase is offset by the lower structural mass with the COBRA vehicle total entry mass being higher by 3,307 kg (3 percent) over the reference vehicle entry mass.

With the calibration of the MER's to reproduce the baseline Mars EDL-SA mass estimate, the XWAT model was integrated into the COBRA environment, with data links established to capture and transmit computed parameters and values to and from the other discipline tools within the design and analysis environment.

TABLE 2

Mass Comparisons of COBRA MERs with EDL-SA Predictions

| Mass Element | Mars EDL-SA, kg | XWAT MER, kg | XWAT/COBRA, kg |
|---|---|---|---|
| Body Structure | 6417 | 6695 | 5983 |
| Aeroshell | 5980 | 6129 | 5417 |
| Body Flap | 437 | 565 | 565 |
| Induced Environment | 16022 | 16063 | 20203 |
| Body TPS | 9217 | 9217 | 13358 |
| Body Flap TPS | 390 | 430 | 430 |
| Acoustic Blankets | 6415 | 6415 | 6415 |
| DHCC | 228 | 228 | 228 |
| Instrumentation | — | 13 | 13 |
| Auxiliary Systems | 1598 | 1598 | 1598 |
| RCS | 4522 | 4501 | 4517 |
| Prime Power | — | 62 | 63 |
| Power Conversion/Distribution | 302 | 322 | 322 |
| Surface Actuation | 442 | 438 | 454 |
| Contingency | 4430 | 4486 | 5011 |
| Dry Mass | 33962 | 34405 | 38433 |
| RCS Propellant | 5500 | 6304 | 6551 |
| Consumables | 23 | 23 | 24 |
| Payload | 68400 | 68400 | 68400 |
| Entry Mass | 110100 | 109133 | 113407 |

Aeroshell Shape Optimization Results.

In order for the shape optimization analysis to be performed, it is important that the objective and constraints for the shape optimization be defined to meet the intended mission requirements. For this analysis, the mission is to land 40MT on the surface of Mars using an aerocapture, followed by an entry trajectory as discussed in the preceding. One goal is to minimize the total entry vehicle mass. As discussed in the preceding, we use a multi-objective genetic algorithm (MOGA) approach to perform the shape optimization necessary to achieve the objectives. From our POD trajectory results, it has been determined that a good estimate of the peak heating trajectory point occurs at a Mach number of approximately 32.5 and a dynamic pressure of 0.15 bars. In addition a target L/D ratio of 0.5 was chosen to match the L/D used in the EDL-SA work [19]. From these values, a MOGA optimizer is run to explore the shape parameter space by utilizing the parametric COBRASQ shape code and the CBAERO engineering aerothermo-dynamics tool. This is done by specifying a set of constraints and objectives with a range of shape parameters for the MOGA optimizer to explore.

The constraints for the optimization study are: 1) determine the number of surface shape triangles which violate the AresV launch fairing envelope limits, 2) impose the conditions $\partial Cm/\partial \alpha < 0$ and 3) $\partial Cm/\partial \beta < 0$. The launch fairing triangle check is used to assure that the vehicle shapes do not violate the launch fairing payload dynamic envelope. The constraints $\partial Cm/\partial \alpha < 0$ and $\partial Cm/\partial \beta c < 0$ are aerodynamic constraints to assure that the aeroshell shapes are statically stable in the pitch plane ($\alpha$) and in the yaw plane ($\beta$), respectively. The objectives are to minimize the peak total heat flux on the vehicle (Total MaxQdot) and to maximize the drag area ($C_D A$), which correlates directly with how quickly the vehicle will decelerate through the atmosphere before reaching the supersonic parachute deployment altitude. Here, higher $C_D A$ is desirable.

Figure 10:
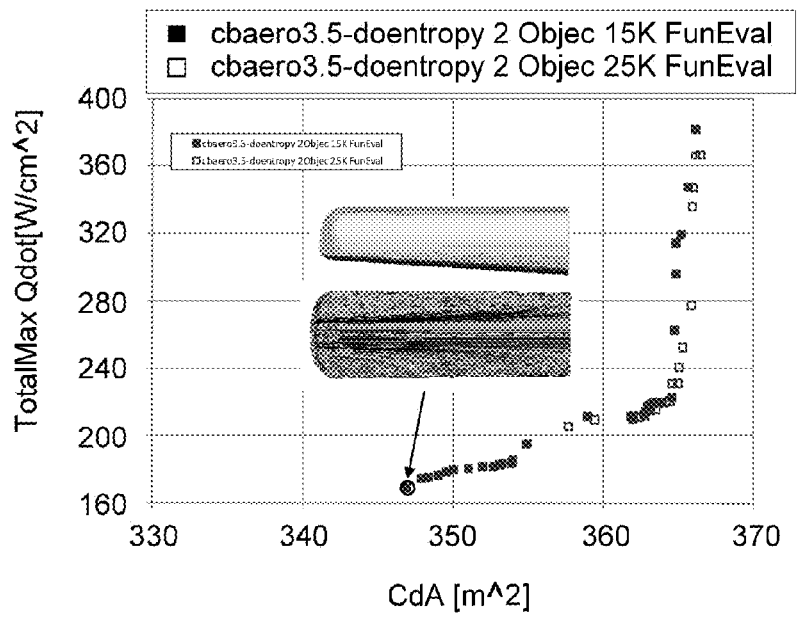
FIGS. 10 and 11 graphically illustrate initial and final Pareto Front results according to a MOGA shape optimization.

The initial MOGA analysis results in a Pareto front set of shapes as shown in FIG. 10. Reasonable convergence is seen by the limited change in the Pareto front for 15,000 to 25,000 function evaluations. However, the shapes are found to have very boxy nose shapes, and the flow at the nose has an attachment line, not an attachment point. Utilizing engineering judgment/experience we realized that these features would under-predict the heating on the nose with the engineering models and that a better range of shape design parameter for the MOGA optimizer to explore would provide more realistic heating and better predictive capability from the aerothermal engineering model.

Figure 9:
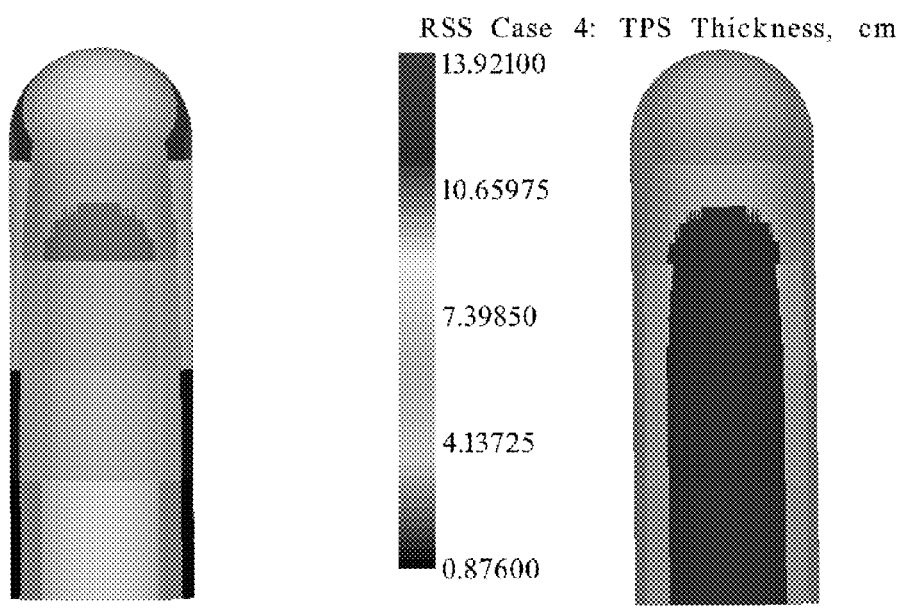
FIG. 9 illustrates TPS sizing results according to the invention.
Figure 11:
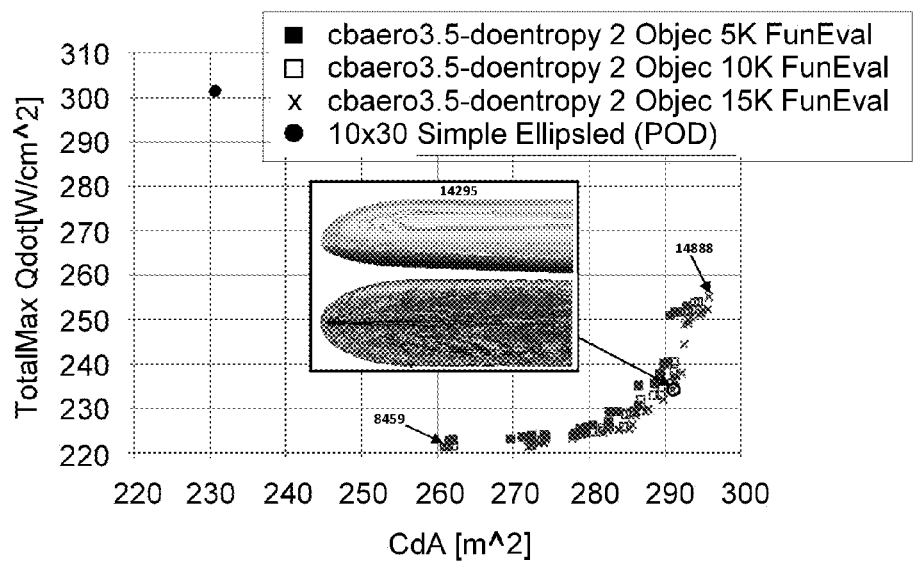

The results of the updated MOGA shape optimization are plotted in FIG. 11. Because any point on the plot in FIG. 9 is a potential solution and the Pareto front includes the solutions that best meet the two objectives there can be multiple solutions. For our purposes the point denoted in FIG. 11 with the open black circle at $C_D A = 293$ m$^2$ and a Total MaxQdot=203 W/cm$^2$ was chosen as the vehicle shape to assess further in the following sections.

Optimized Shape Comparison with High Fidelity Aero/Aerothermal.

Figure 12:
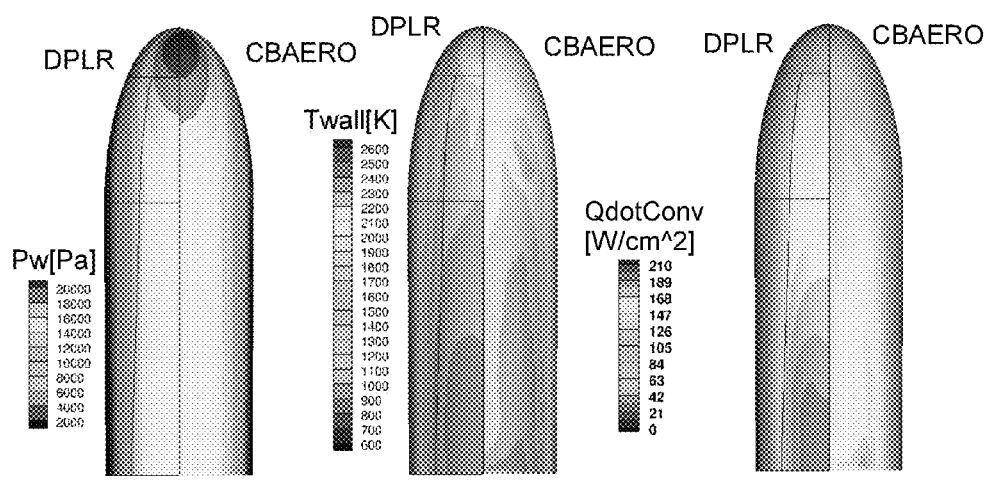
FIG. 12 compares aerothermal values computed using a CBAERO Code and a DPLR Code.

An engineering aerothermal tool has been used to predict the aerodynamics and aeroheating within the MOGA shape optimization process. This approach allows us to evaluate a vast number of shapes and to explore sufficiently the design space. In order to verify the accuracy of the tool for these optimized shapes, we choose a point of the new Pareto front to compare with higher fidelity computations. For this purpose, we use the DPLR aerothermodynamic tools and compare at one point on the Pareto front. The comparison point, denoted in FIG. 11 with the black circle "o," will be referred to as "design14927," because it is the 14,927th design evaluated by the GA. Comparison of the surface pressure, temperatures and convective heating are shown in FIG. 12 for this shape at a Mach number of 32.5, dynamic pressure of 0.114 bar, and angle-of-attack of 56.4 degrees.

Figure 6:
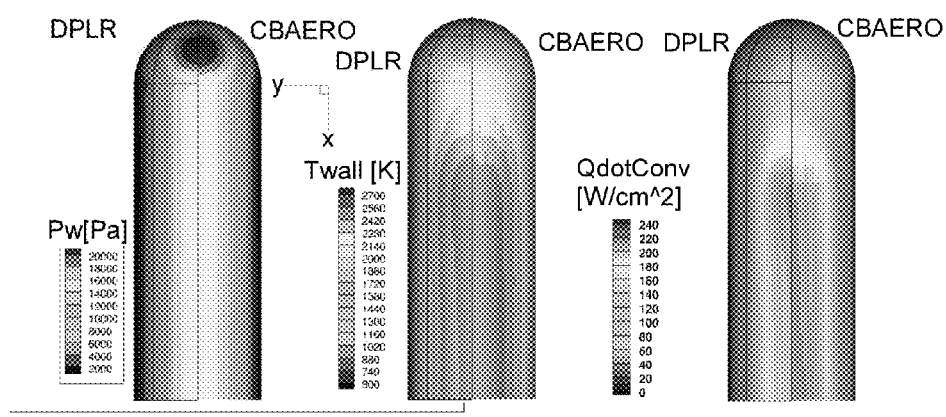
FIG. 6 compares aerothermal values between a DPLR Code and a CBAERO Code.

As with the earlier 10×30Ellipsled results of FIG. 6, the surface pressure comparison between DPLR and unanchored CBAERO for this "14297 shape" (FIG. 11) show excellent agreement. The unanchored CBAERO heating results appear to be about 10 percent lower than the DPLR real-gas Navier-Stokes results. The anchoring process referred to earlier would normally be performed on the downselected shapes which would provide the heat transfer corrections on the engineering CBAERO model results with a sparse set of DPLR solutions. For the purposes of this current study, the present level of agreement, in the range of anticipated heating uncertainty, is believed to be adequate.

Discussion of the Physics Behind the MOGA Shape Selection.

The advantage in hypersonic aerothermal performance of the optimized body over the baseline body can be understood through examination of FIG. 13A. Both bodies exhibit an attachment line topology along the windward centerline, and it is expected that heating will vary inversely with shock standoff (dn) of the optimized body relative to the baseline body. This greater shock standoff is associated with the larger spanwise radius of curvature. This is confirmed in FIG. 13A, which shows graphs of velocity and temperature profiles normal to the surface as obtained from the DPLR turbulent, real gas Navier-Stokes solutions. These profiles are for comparable locations just forward of the base on the aft-body windward centerline for both the baseline and the optimized body. As can be seen, the shock standoff for the optimized body is approximately 0.85 meters, compared to 0.55 meters for the baseline body. Further, the boundary layer thickness is greater for the optimized body (0.15 m) compared to the boundary layer thickness of the baseline body (0.10 m) at this aft windward centerline location. An additional factor in promoting a thick boundary layer and lower heating for the optimized body is the reduced spanwise streamline divergence associated with a larger spanwise radius of curvature.

FIG. 13B provides additional insight into why the optimized body provides enhanced aerodynamic performance over the baseline body. Consider that the maximum lift of a flat plate in hypersonic flow can be found, using Newtonian methods, at approximately 55 degrees angle of attack (AoA). The surface normal of an arbitrary surface element is a unit length vector expressed as ($n_x$, $n_y$, $n_z$). At a given angle of attack, Newtonian methods will predict a pressure on this surface element proportional to $U*(Sin(AoA)*n_z*n_z+Cos(AoA)*n_x*n_y)$, with a contribution by the surface element to the total lift that is roughly proportional to Sin(AoA) and a contribution of this surface element to the total drag roughly proportional to Cos(AoA). Note that the out-of-pitch-plane component of the surface normal component, $n_y$, does not contribute to the generation of surface pressure, nor does it contribute to the integrated lift, nor to the integrated drag of the body. Rather, the yaw component $n_y$ of the surface normal is ineffective in contributing to hypersonic aerodynamic performance (with the exception of yaw stability effects). FIG. 13B contrasts the $n_y$ component for the windward surfaces of the optimized body (Body D=14297), as compared to the baseline body (BaseL=POD), with the region about the centerline for the optimized body having a more extensive area of lower $e_y$ surface normal. This greater extent of lower $n_y$ surface normal about the centerline is related to the larger spanwise radius of curvature for the optimized body as described in connection with that body's lower heating. These rather simple physical arguments help explain the greater lift, drag and lower heating for the optimized body.

As for the effect of streamlines between the two shapes, the windward aft centerline streamtube for the optimized aeroshell has reduced streamtube divergence when compared to the baseline. This is believed to be related to the spanwise radius of curvature along the attachment line (centerline) for the optimized aeroshell being greater than the curvature of the baseline body which is geometrically related to the yaw component $n_y$, increasing more slowly as y increases away from the centerline. These geometric and streamtube observations likely contribute to the greater shock standoff and the larger boundary layer thickness, strongest along the windward centerline, for the optimized body relative to the baseline body.

COBRA Integrated System Architecture Optimization Results.

In the following sections the results for the integrated system optimization analysis performed within the COBRA environment are discussed. Three optimized aeroshell shapes from the Pareto front in FIG. 14A-14D, including designs 8459, 14297 and 14888, are selected for an integrated system optimization. This requires performance of optimization for trajectory, structures, and TPS sizing, followed by vehicle closure. Tables 3 and 4 show system optimization results for the three optimized aeroshell architectures compared to our POD architecture.

TABLE 3

Comparison of Integrated System Analysis Optimization Part I

| AEROSHELL SHAPES | GA Objectives | | | | | | | | | |
|---|---|---|---|---|---|---|---|---|---|---|
| | CDa $m^2$ | Max Qdot Total $W/cm^2$ | αtrim deg | Swet $m^2$ | Aerocapture Peak Q-alpha Pa-deg | Entry Peak Q-alpha Pa-deg | As-Built Structure Mass Kg | RSS TPS Mass Kg | TPS Volume $m^3$ | Total Vehicle Mass Kg |
| 10 × 30 POD (Baseline) Front View Rear View Left View Bottom View | 231 | 302 | 51.78 | 1021 | 601601 | 564194 | 5417 | 13358 | 51 | 113407 |
| 14888 Front View Rear View Left View Bottom View | 296 | 255 | 56.09 | 937 | 555650 | 530860 | 6967 | 8676 | 34 | 108745 |

TABLE 4

Comparison of Integrated System Analysis Optimization Part II

| AEROSHELL SHAPES | GA Objectives | | | | | | | | | |
|---|---|---|---|---|---|---|---|---|---|---|
| | CDa $m^2$ | Max Qdot Total $W/cm^2$ | αtrim deg | Swet $m^2$ | Aerocapture Peak Q-alpha Pa-deg | Entry Peak Q-alpha Pa-deg | As-Built Structure Mass Kg | RSS TPS Mass Kg | TPS Volume $m^3$ | Total Vehicle Mass Kg |
| 8459 (Front View, Rear View, Left View, Bottom View) | 261 | 221 | 56.90 | 877 | 605732 | 604257 | 5517 | 8468 | 33 | 106234 |
| 14297 (Front View, Rear View, Left View, Bottom View) | 291 | 234 | 56.77 | 882 | 567992 | 542518 | 6110 | 7748 | 30 | 106088 |

Integrated Trajectory Optimization Results.

Figure 14A:
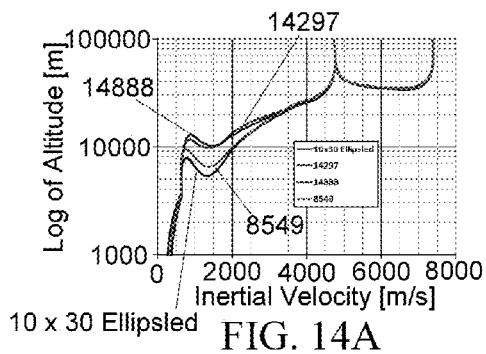
FIGS. 14A-14D compare trajectories for three optimized shapes with trajectories for the 10×30 Ellipsled POD.
Figure 14B:
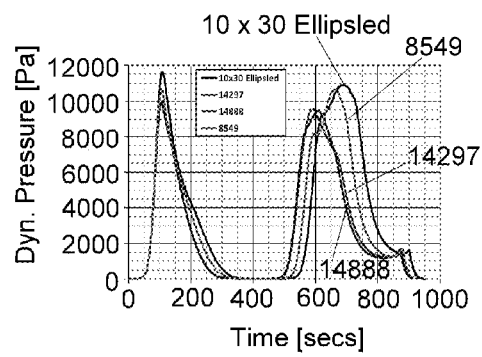
Figure 14C:
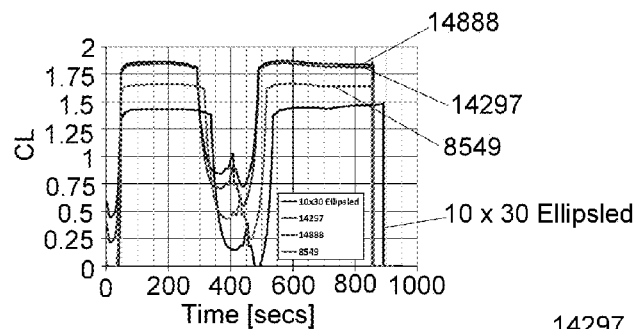
Figure 14D:
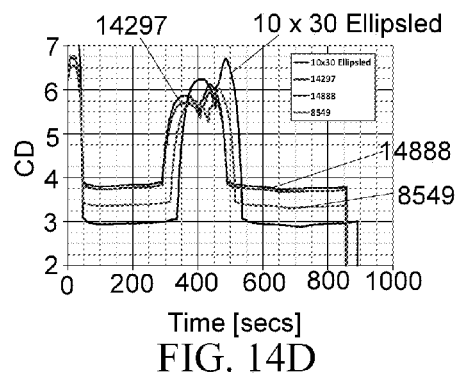

In FIGS. 14A-14D, trajectory comparisons between the three optimized shapes are compared to the 10×30 Ellipsled POD. Note that the dynamic pressure is reduced with the optimized aeroshell shapes and is attributed to the higher drag coefficient (FIG. 14D) that these shapes provide which allows them to more efficiently dissipate the energy higher in the atmosphere (FIG. 14A) as compared to the POD, and results in lower free stream dynamic pressure. leading to lower heating. In addition the optimized shapes also provide higher lift, as shown in FIG. 14C, which also allows the body to maneuver and to achieve the same end conditions as the POD.

Figure 15A:
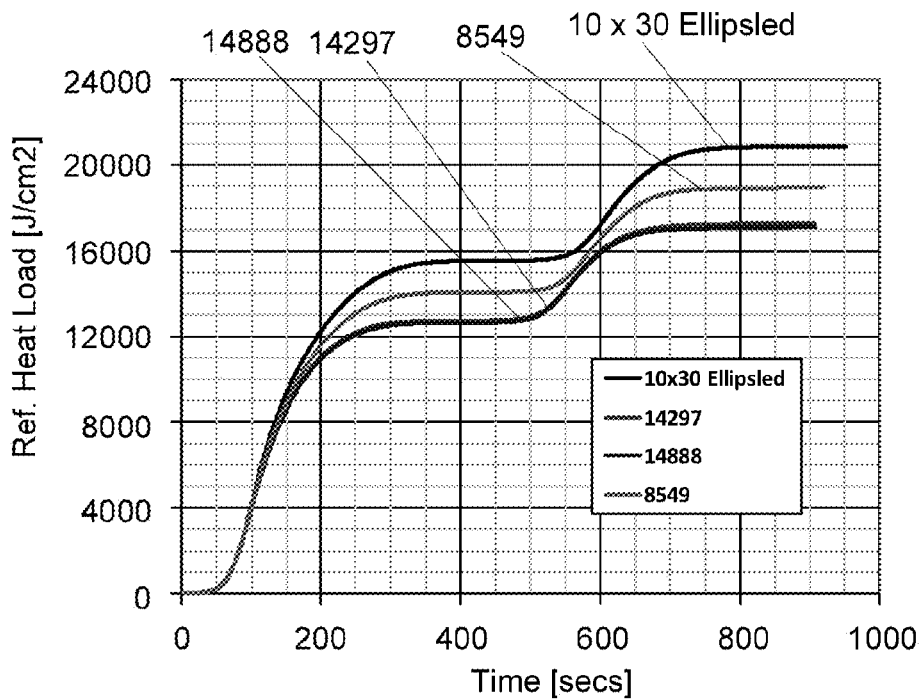
FIGS. 15A-15B compare integrated heat load plots and TPS thicknesses for the three optimized shapes with corresponding values for the 10×30 Ellipsled POD.
Figure 15B:
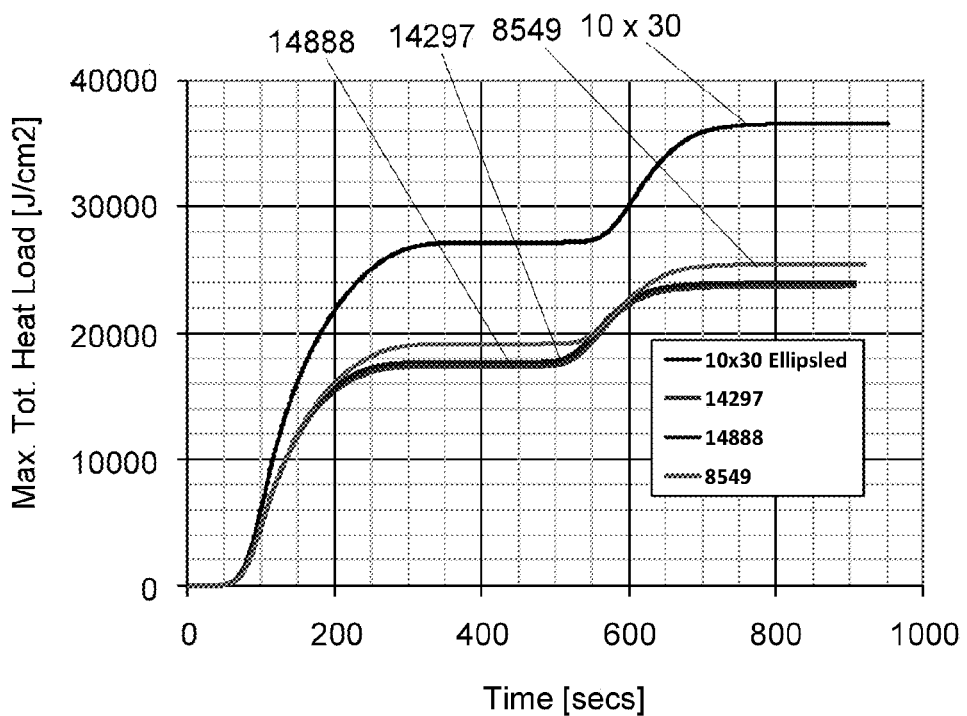

In FIGS. 15A-15B, the integrated heat load plots and TPS thicknesses for the three optimized shapes are compared with the 10×30 Ellipsled POD. FIG. 15A is a plot of the reference integrated heat load versus trajectory, based on a referenced one meter nose radius that is used in the COBRA trajectory module optimization to minimize the reference heat load. Although this is only an estimate of the actual heat load experienced by each shape, this approach provides a means by which the trajectory optimization can utilize the vehicles' lift and drag to achieve the trajectory objective. Providing a reference heat load also isolates its impact on the trajectory for configurations, apart from the local surface heating experienced by each aeroshell shape. The result of this reference heat load comparison shows how the aerodynamic effects of the optimized shapes, allow for lower heat load as compared to the baseline 10×30 Ellipsled. This is attributed to the aerodynamic performance of the optimized shapes, shown in FIGS. 14A-14B which exhibit higher lift and drag and allow these aeroshell shapes to loft higher in the atmospheric while dissipating the same energy needed to reach the 1-SOL orbit or the surface of Mars. This, in turn, keeps the aeroshell at a lower dynamic pressure and helps reduce the vehicle heating. FIG. 15B shows a more representative integrated heat load of each shape along the trajectory by tracking a nominal peak heat flux point throughout the trajectory. Note that the final integrated heat-load for each the optimized aeroshells is lower than the integrated heat load of the baseline. This is attributed to the improved trajectories obtained by the higher performing aeroshell shapes, and to the lower heat flux around these optimized aeroshell shapes. Table 5 summarizes maximum values of key trajectory parameters that influence subsystem masses presented below.

TABLE 5

Comparison of maximum trajectory parameters

|  | 10X30 POD | 14888 | 8459 | 14297 |
|---|---|---|---|---|
| Max $g_E$'s | 2.81 | 3.10 | 2.05 | 3.08 |
| Max Lateral $g_E$'s | 2.74 | 3.07 | 2.93 | 3.01 |
| Max qBAR, pa | 11630 | 9907 | 10645 | 10005 |
| Max q-α, pa-deg | 602200 | 555644 | 605728 | 568020 |
| Ref. Heat Load, J/cm$^2$ | 28055 | 17105 | 18944 | 17283 |
| Max Heat Load, J/cm$^2$ | 36639 | 24010 | 25648 | 23729 |

Integrated Structure Optimization Results.

With the trajectory information obtained for each shape, the peak dynamic pressure loading information is extracted from the ADB (Aerothermal-Database). The pressure loading is used to perform structural optimization to evaluate the aeroshell structural mass to be used in the vehicle closure analysis. The structural stack-up is also passed to the TPS sizing tool. This provides for a consistent structural layout for the TPS sizing analysis to be performed. An unexpected result of coupling these analyses is that the increased structural weight of the optimized shapes, with their flatter windward surfaces, increases the structural thickness stack up on the windward surface, providing additional thermal mass for the TPS where the highest heat load occurs. Further details of this finding are discussed in the following TPS section.

Integrated TPSSIZER Results

Figure 16:
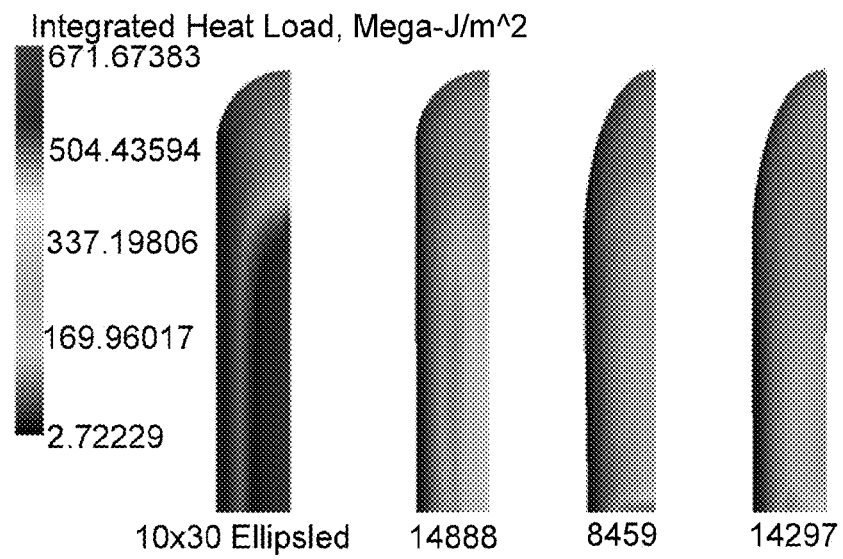
FIGS. 16 and 17 compare heat loads and TPS thicknesses for different surface shapes.
Figure 17:
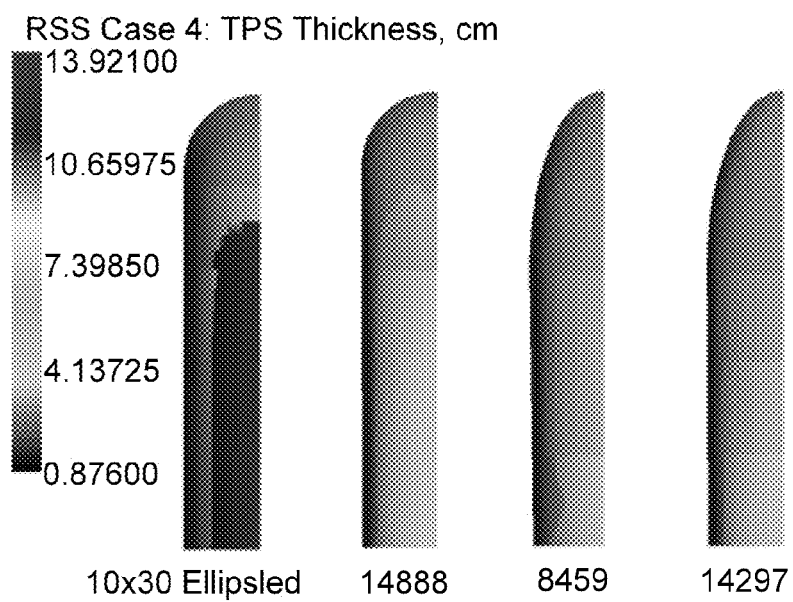

At this point the optimized nominal trajectory obtained from POST is used to estimate the integrated heat load from the ADB for each aeroshell shape. FIGS. 16 and 17 show surface contour comparisons of integrated heat load and TPS thickness on the windward side for the three Pareto optimum aeroshell shapes as compared to the POD. Note that there is a significant decrease in the maximum heat load and TPS thickness distribution for each Pareto optimal aeroshell shape as compared to the 10×30 Ellipsled POD.

Integrated Vehicle Sizing

Table 5 presents a comparison of the final mass estimates for the 10×30 POD and the Pareto optimal aeroshell configurations. The structural and TPS masses have been discussed above. The reduction in acoustic blanket mass for the Pareto optimal designs depends upon the reduced wetted area. All other subsystem masses are comparable to the 10×30 POD configuration, with reduction in power generation, conversion & distribution and surface actuation systems attributable to lower trajectory g-loads and to free-stream dynamic pressure which drive the MER's for these subsystems.

Configuration design 14888 has an 11 percent reduction in dry mass compared to the 10×30 POD, while the other two Pareto front designs reduce dry mass by 18 percent. Comparing these other two designs, the 8459 design configuration trades lower structural mass for higher TPS mass, with configuration design 14927 having higher structural mass and lower TPS mass. The sum of the two masses is approximately the same for both designs. Finally, the total vehicle entry mass for the three Pareto optimal designs shows an overall reduction between 4 percent and 6 percent compared to the 10×30 POD. This translates into approximately 4,000-7,000 Kg mass savings that could be used to increase the useful landed payload mass of 40,000 kg by 10-16 percent.

TABLE 6

Comparison of mass statements

| Mass Element | 10X30 POD, kg | 14888 | 8459 | 14297 |
|---|---|---|---|---|
| Body Structure | 5983 | 7532 | 6082 | 6675 |
| Aeroshell | 5417 | 6967 | 5517 | 6110 |
| Body Flap | 565 | 565 | 565 | 565 |
| Induced Environment | 20203 | 14996 | 14407 | 13722 |
| Body TPS | 13358 | 8676 | 8468 | 7748 |
| Body Flap TPS | 430 | 431 | 41 | 431 |
| Acoustic Blankets | 6415 | 5889 | 5509 | 5543 |
| DHCC | 228 | 228 | 228 | 228 |
| Instrumentation | 13 | 13 | 13 | 13 |
| Auxiliary Systems | 1598 | 1598 | 1598 | 1598 |
| RCS | 4517 | 4495 | 4459 | 4457 |
| Prime Power | 63 | 58 | 58 | 57 |
| Power Conversion/Distribution | 322 | 267 | 284 | 266 |
| Surface Actuation | 454 | 410 | 409 | 402 |
| Contingency | 5011 | 4112 | 4130 | 4112 |
| Dry Mass | 38433 | 34041 | 31675 | 31537 |
| Dry Mass Fraction | .3389 | .3130 | .2982 | .2873 |
| RCS Propellant | 6551 | 6282 | 6137 | 6128 |
| Consumables | 24 | 22 | 22 | 22 |
| Payload | 68400 | 68400 | 68400 | 68400 |
| Entry Mass | 113407 | 108745 | 106234 | 106088 |

Economic Impact of Mission/System Optimization.

The projected increase of 4000 to 7000 kg of useful landed payload mass from the current 40,000 kg projected, may at first be interpreted as a 12-19 percent gain. However, this gain in landed payload is for a fixed launch mass and approximately fixed mission costs. A more realistic perspective on true economic impact of these present methods on National Space policy, is that the extra potential landed payload mass represents additional value from each mission. Where each mission to Mars costs approximately $2 billion per launch (based on MSL), and as much as $20 billion for an Ares V launch [24], the additional landed payload represents an additional economic value of approximately $200 Million per launch.

An alternative interpretation is that, if the comparison is robotic precursor mission versus human exploration mission, requiring landing multiple large payloads on Mars, approximately one out of ten launches could be eliminated to achieve the same total landed payload mass to Mars. Again the total saving become large, given the substantial costs of landing payloads on Mars. This increases the economic viability of such a proposed program. Because the current approach is also applicable to Earth LEO and ISS access, the potential impact on economic viability of private commercial efforts should also be appreciable.

The references cited herein are incorporated by reference in this document.

Application of an integrated Multi-Disciplinary Optimization (MDO) system analysis procedure for a Mars heavy mass entry payload mission has been conducted and is described in this paper. The MDO system analysis procedure utilizes a multi objective genetic algorithm (MOGA) optimization of the entry vehicle's outer mode line (OML) based on a parametric family of aeroshell shapes, and incorporates the thermal protection system (TPS) sizing and structural optimization along with trajectory optimization specific to each aeroshell shape being considered. One goal is to minimize projected total vehicle entry mass for a given desired landed mass, or to maximize projected landed payload for a given launch mass.

The engineering disciplines of aerodynamics, aerothermodynamics, trajectory optimization, structural optimization, TPS sizing, are incorporated in the MDO procedure by means of either evaluating engineering-fidelity or high-fidelity physics-based analysis codes. All other mass-driven subsystems are represented by Mass Estimating Relations (MERs) to allow for vehicle closure. The MDO system optimization approach is used with system constraints and objectives, including launch vehicle payload fairing, hypersonic aerodynamic stability, such as ballistic coefficient, lift and drag, trajectory down- and cross-range constraints, and aerothermodynamic considerations such as peak heating, and integrated heat load. Two global system objectives are: (1) to choose a shape that minimizes entry mass for a given payload, and (2) to maximize landed payload for a given vehicle entry mass. A point-of-departure (POD) architecture is used to validate and provide a reference point upon which to evaluate the improvements resulting from the MDO system procedure. For the optimized shape selected, a decrease in entry vehicle mass is achieved, which translates into a increase in landed payload of approximately 4000-7000 Kg over the 40,000 Kg useful payload mass being considered.

An additional advantage of the integrated MDO environment is in the clarification of the interaction of disparate discipline experts in mission design by providing a well-defined means by which their expert input is incorporated into the system design analysis, while providing the opportunity for consistent and fair comparison among the various design architectures and options for engineering tradeoffs. This MDO environment also provides automatic archiving of results and assumptions to be used as a basis for later review and/or re-analysis due to changes in mission constraints and/or objectives.

Finally, the projected economic benefit of the optimized architectures found by this MDO process shows that approximately one in ten launches could be eliminated based on the increased predicted landed payload mass translating into an approximate savings of $200 million per launch for a Mars heavy payload mass mission.

Appendix A. The Super-Quadric Equation and Generalizations Thereof.

The super-quadric equation is itself a generalization of a three-dimensional ellipsoid equation, (where all exponents equal 2) and may be written in Cartesian coordinates (x,y,z) in the x-specific form of the standard super-quadric equation, $$(x/x1)^a+((y/y1)^b+(z/z1)^b)^{a/b}=1, \tag{A-1a}$$

where x1, y1 and z1 are the positive semi-axis lengths, a and b are exponents with values greater than 1. With appropriate coordinate rotations, one can obtain either a y-specific or z-specific form of the standard super-quadric equation:

$$(y/y1)^a+((x/x1)^b+(z/z1)^b)^{a/b}=1 \tag{A-1b}$$

$$(z/z1)^a+((y/y1)^b+(x/x1)^b)^{a/b}=1 \tag{A-1c}$$

In these x-, y-, or z-specific standard super-quadratic equation forms, the semi-axis lengths and exponents are treated as constant.

However, to accomplish a first generalization of the x-specific form, it is possible to express the semi-axis lengths of y1 and z1, and the exponent b is a function of x:

$$(x/x1)^a+\{(y/y1(x))^{b(x)}+(z/z1(x))^{b(x)}\}^{a/b(x)}=1 \tag{A-2a}$$

Similarly y-specific and z-specific super-quadric generalizations of the first type can be expressed as $$(y/y1)^a+\{(x/x1(y))^{b(y)}+(z/z1(y))^{b(y)}\}^{a/b(y)}=1 \tag{A-2b}$$

$$(z/z1)^a+\{(y/y1(z))^{b(z)}+(x/x1(z))^{b(z)}\}^{a/b(z)}=1 \tag{A-2c}$$

The now variable coefficient functions, e.g. b(x), y1(x), etc., should be continuous and the variable exponents should also be constrained to be equal to 1 or greater.

To arrive at another or second generalization form of the super-quadric equation first consider that an yz plane cut at constant x in the range of [−x1,x1] of the x-specific form of the standard super-quadric equation can be made and the resulting curve can be expressed as the x-specific form of the standard super-ellipse equation:

$$(y/y1)^a+(z/z1)^a=1, \tag{A-3a}$$

where, as before "a" is a constant greater than 1, and y1 and z1 are constant semi-axis lengths. Likewise, the y-specific and z-specific form of the standard superellipse equation can be expressed as:

$$(x/x1)^a+(z/z1)^a=1, \tag{A-3b}$$

$$(y/y1)^a+(x/x1)^a=1, \tag{A-3c}$$

A second generalization of the super-quadric equation can now be expressed in x-specific, y-specific and z-specific forms $$(y/y1(x))^{a(x)}+(z/z1(x))^{a(x)}=1, \tag{A-4a}$$

$$(x/x1(y))^{a(y)}+(z/z1(y))^{a(y)}=1, \tag{A-4b}$$

$$(y/y1(z))^{a(z)}+(x/x1(z))^{a(z)}=1, \tag{A-4c}$$

where the semi-axis and exponents are no longer treated as constants but suitably constrained parameters, themselves functions of x, y or z, giving a greater range of shapes than is otherwise possible. Equations (A-4a), (A-4b), and (A-4c) may be referred to as the x-specific, y-specific and z-specific super-quadric generalizations of the second type, or collectively as either super-elliptic or super-quadric generalizations of the second type.

Note that the standard super-elliptic forms can be derived from the equations for the super-quadric generalizations of the second type, and the standard super-quadric equations forms can be derived from the equations for the super-quadric generalizations of the first type. Thus the standard forms of these equations may be considered to be included as a subset of possible equation in the set of generalized parametric super-quadric or super-elliptic equations, and we may use the known behavior of the standard super-quadric and super-elliptic equations as an intuitive guide to the behavior of the extended forms of these equations.

Appendix B. Computer Code Summaries.

COBRASQ: Given the geometric parameters describing the six sectional shapes for the vehicle, this Code applies C1 continuity at interfaces of adjacent sections to provide a "smooth" surface with no corners or discontinuities. The code generates surface mesh descriptions in either structured plot3d or as unstructured triangulations enabling the use of a small set of geometric parameters to define the vehicle's outer mold line (OML) which provides shapes with a range of aerodynamic and aerothermodynamic properties useful for optimization.

ACVe: Is a parametric geometry code for a low Lift to Drag (L/D) re-entry capsule vehicle shape with enhance performance based on an asymmetric ellipsoidal heatshield shape. Similar to the COBRASQ code, this code generates surface mesh descriptions in either structured plot3d or as unstructured triangulations enabling the use of a small set of geometric parameters to define the vehicle's outer mold line (OML)

ApolloMesher: Is a parametric geometry code based on the Apollo/CEV-type truncated-sphere/torus capsule shape. Similar to the COBRASQ code, this code generates surface mesh descriptions in either structured plot3d or as unstructured triangulations enabling the use of a small set of geometric parameters to define the vehicle's outer mold line (OML).

ProE: Pro Engineer (ProE) is a Commercial CAD tools which provides Integrated, parametric, 3D CAD/CAM/CAE solutions and has been integrated into the Cobra MDO process to provide a similar small set of parametric shape control as the above parametric geometry codes however for more complicated geometries manipulation but limited to unstructured surface geometry triangulations.

CBAERO is an engineering analysis code based on independent panel methods, such as modified Newtonian flow adjacent to a flow-defining surface, along with a surface streamline algorithm and an extensive set of validated engineering correlations to determine surface pressure, convective and radiative heating, shear stress, and boundary layer properties.

DPLR: The Data-Parallel Line Relaxation (DPLR) code is a high-fidelity, physics-based, 3-D real-gas time-dependent Navier-Stokes formulation, including heat and energy transfer. DPLR provides viscous real-gas hypersonic aerodynamics and aerothermodynamic predictions which can be used to anchor the CBAERO aerodynamic database at hypersonic down to high supersonic speeds.

NEQAIR is a high-fidelity radiation code, to give radiation effect results, either in support of or replacing CBAERO data.

LAURA: The Langley Aerothermodynamic Upwind Relaxation Algorithm (LAURA) code is a high-fidelity, physics-based, 3-D real-gas Navier-Stokes formulation, a kin to DPLR providing viscous real-gas hypersonic aerodynamics and aerothermodynamic predictions which can be used to anchor the CBAERO aerodynamic database at hypersonic down to high supersonic speeds.

OVERFLOW: The OVERset grid FLOW (OVERFLOW) solver—is a high-fidelity software package for simulating compressible 3-D perfect-gas time-dependent Navier-Stokes equations using multiple overset structured grids. OVERFLOW provides viscous aerodynamic predictions which can be used to anchor the CBAERO aerodynamic database at low supersonic down to subsonic speeds.

Cart3D: Cart3D is a mid-fidelity, 3-D perfect-gas time-dependent Euler formulation code using 3-D Cartesian grids to provide inviscid aerodynamic predictions which can be used to anchor the CBAERO aerodynamic database at low supersonic down to high transonic speeds.

POST2: a Program to Optimize Simulated Trajectories for a specified atmosphere, including L/D, ballistic coefficients, and peak heating. Constraints on the trajectory flight dynamics, such as gravitational loading on the vehicle are also imposed. This code identifies nominal trajectories for each vehicle under consideration. POST2 is wrapped inside the Cobra MDO environment (discussed in the preceding) to identify input parameters necessary to simulate the aerocapture trajectory and entry trajectory that are part of the analysis and optimization.

TPSSIZER: The Thermal Protection Sizer (TPSSIZER) code is use to predict TPS thicknesses and mass estimates at prescribed surface zone locations on the vehicle shape by computing the maximum temperature and integrated heat load for a set of selected points on the surface of the vehicle based on flying a defined set of trajectories through the aerodynamic database space and meeting specific mission constraints such as maximum TPS bond line temperatures.

FIAT: The Fully Implicit Ablation and Thermal response program (FIAT) simulates one-dimensional transient thermal energy transport in a multilayer stack of thermal protection system (TPS) materials and structure that can ablate from the top surface and decompose in-depth. FIAT is integrated into the Cobra MDO process as through TPSSIZER which calls FIAT for analyzing TPS ablative materials sizing.

SINDA: Analysis software for conduction, convection, and radiation heat transfer material response modeling utilized for analyzing non-ablating TPS materials sizing and is integrated into the Cobra MDO process through TPSSIZER.

MSC NASTRAN: Vehicle structure response code, including normal stress, shear stress, bending stress and other mechanical responses. NASTRAN is integrated into the Cobra MDO process by transferring the surface pressure loading which are extracted either from the CBAERO engineering aerodynamic database or from an anchored aerodynamic database based on the higher fidelity aero/aerodynamic tools to the structure elements assigned for each geometry to perform a structural optimization to minimize the vehicle aeroshell structural mass.

XWAT/XClosure: Provides an estimate of the delivered payload or the entry vehicle mass utilizing mass estimating relationships (MER) which are empirical vehicle mass scaling of subsystems from historical mass distributions for other missions and scaled to the particular vehicle shape parameters selected by the MDO algorithm. XWAT is an XML based C++ application that computes weight/mass of any space vehicle. XWAT can be applied to launch vehicles and to EDL studies.

DAKOTA: The Design Analysis Kit for Optimization and Terascale Applications (DAKOTA) toolkit is a flexible extensible interface between analysis codes and iterative systems analysis methods. DAKOTA contains algorithms for optimization with gradient and nongradient-based methods; uncertainty quantification with sampling, reliability, stochastic expansion, and epistemic methods; parameter estimation with nonlinear least squares methods; and sensitivity/variance analysis with design of experiments and parameter study methods. DAKOTA is integrated into the Cobra MDO process in order to utilizing its Multi-Optimization Genetic Algorithm (MOGA) to simultaneously optimize the vehicle aeroshell shape with respect to aerodynamic and aerothermodynamic objectives in order to then optimized the structural, TPS, and overall entry mass or payload mass from a multidimensional Pareto-Edgeworth optimal front of aeroshell shapes.

The Codes referred to by name in the preceding can be replaced by other equivalent codes. At the minimum, this invention requires use of a COBRASQ code for estimation of vehicle surface geometric parameters, as indicated in Eq. (1) in the preceding, a hydrodynamics code, with or without real gas effects included, an aerothermodynamics code (optionally including heat transfer effects), a structure response code and a trajectory code.

| Multi-Disciplinary Computer Code Fidelity | | | |
|---|---|---|---|
| Discipline | Code Name | Description | Fidelity |
| Geometry/mesh generation | COBRASQ | Parametric surface tool | Analytic |
| Aero/Aerothermo | CBAERO | Engineering Aerothermo | Engrg. |
| Aerothermodynamics Aero/convective heat | DPLR | High fidelity CFD | High |
| Aerothermo/radiative Heating | NEQAIR | Predict shock radiation vehicle heating | High |
| Trajectory optimiz. | POST2 | Traj. Optimization | Mixed |
| Ablative/non-ablative | TPSSIZER | 1-dim heat | High |

-continued

Multi-Disciplinary Computer Code Fidelity

| Discipline | Code Name | Description | Fidelity |
|---|---|---|---|
| TPS analysis | | conduction/ TPS analysis | |
| Mass/volume estimation | XWAT | Mass/volume estimation | Engrg. |

Appendix C. Discussion of Flow Charts in FIGS. 18, 19 and 20.

The purpose of the Cobra MDO Multi-Discipline Optimization process is to explore the full set of design space to determine if all of the specified mission constraints are met and to perform the required engineering analysis for each considered set members so as to evaluate performance optimization goals and in so doing to establish and fully populate the Pareto-optimal subset. The particular MDO algorithm chosen and details of the MDO process may be accomplished by many approaches known to practitioners of the art. A brute force approach simply evaluates each and every member of the full design space, or of a suitable dense subset, to determine if any particular member meets all constraints and evaluate performance so as to retain only those members which meet the Pareto optimum criterion. However, more efficient MDO algorithms exist and are known to practitioners of the art and are considered to be included by reference. The particular approach described herein is that of the Multi-Objective Genetic Algorithm. Further, the details of any particular flowchart can vary considerably depending on the details of the mission constraints and optimization objectives, and the flowcharts discussed in this Appendix summarize three possible approach. Variations in such a process are known to practitioners of the art and are incorporated by reference.

Design alternatives represented by members of the full design space set that are not members of the Pareto Optimum set produced by the described MDO process, are sub-optimal in some sense and need not be considered further in a design process. It is anticipated, with appropriate assignment of mission constraints and optimization goals, that the Pareto Optimum set will be much reduced in size relative to the full design space. Once found by the process described, the Pareto Optimum set consists only of those design alternatives which may be efficiently considered further in detailed engineering tradeoff studies or by other means invoking detailed human interaction, such as human values and human judgment.

A vector in design space is described by an P-tuple vector $Vj=(v1(j), v2(j), \ldots, vP(j))$, where $j=1, 2, \ldots$ is an index referring to the number of the present iteration, in parameter space, where $v1(j), v2(j) \ldots$ are the COBRASQ shape parameters described elsewhere. Upon evaluation, a candidate vector Vj is considered to be Pareto-Efficient and to be a member of the Pareto-Optimum subset, for a given mission being considered, the member meets all specified mission constraints and, further, in evaluating those performance standards being optimized, that a small variation in parameter space will not lead to a more desirable solution, where a neighboring point, $Vj+\Delta Vj$ is preferred in terms of at least one performance standard being optimized without also being less desirable in at least one other candidate performance parameter being optimized.

Figure 18:
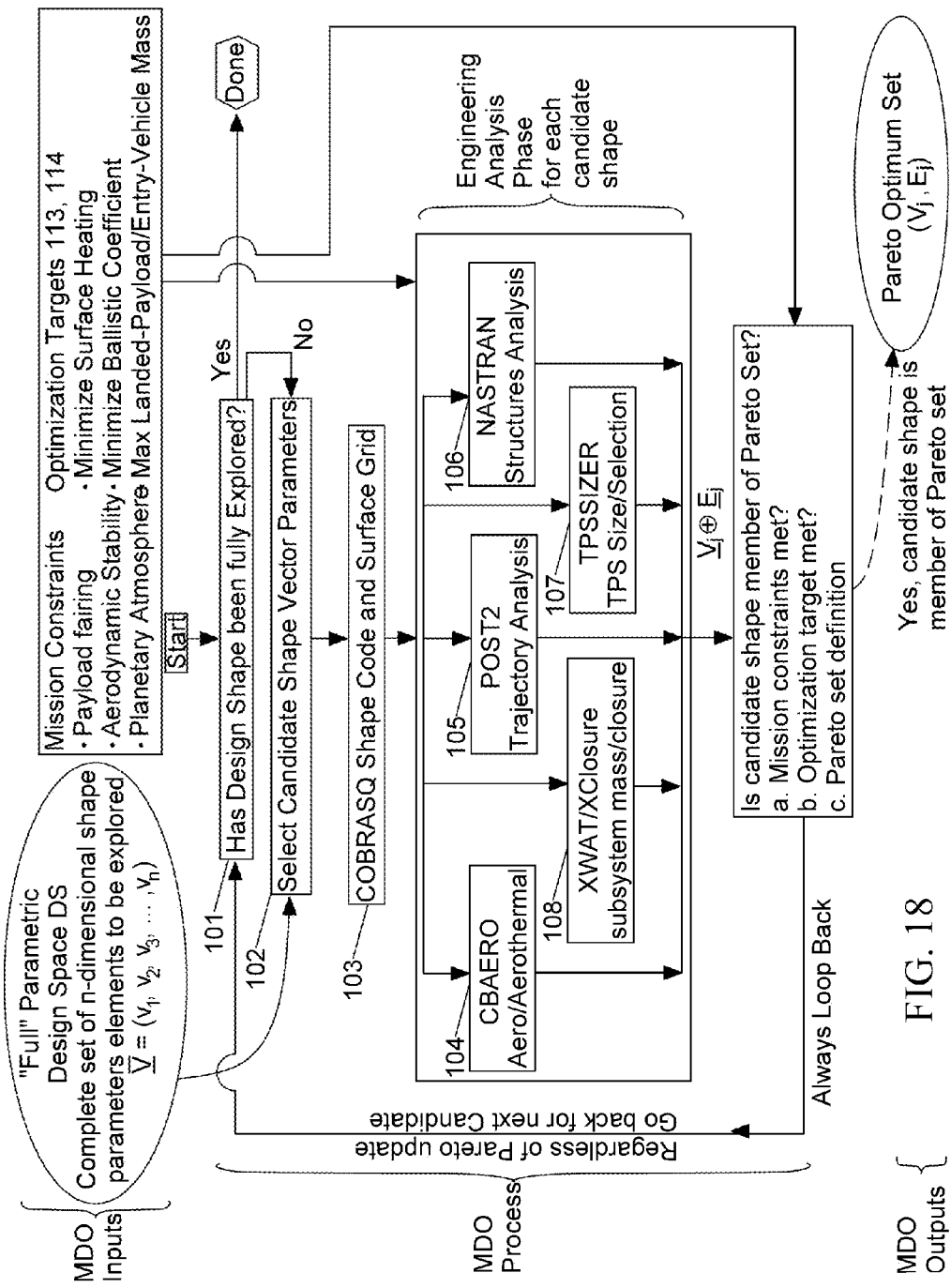
FIGS. 18, 19 and 20 illustrate three procedures for practicing the invention.

FIG. 18 is a general overall flow chart showing a general form of the Cobra MDO process. The inputs to the Cobra MDO process will include (1) the specified full design parameter space, (2) the mission constraints, and (3) the performance standards being optimized. The MDO process will include (1) The MDO driver, (2) the COBRASQ shape code, or equivalent, (3) Engineering Analysis codes, such as CBAERO, MSC NASTRAN, POST2, TPSSIZER, XWAT, etc, (4) a Pareto-Optimum subset to be populated, which is the desired output. In step 101, the system determines if the design space DS is fully explored, based on selected criteria. In step 102, the MDO driver algorithm selects a candidate shape vector Vj and provides a corresponding set of shape parameters or components $v1, v2, \ldots, vP$ for that candidate vector for the COBRASQ shape code. In step 103, the COBRASQ shape code generates the candidate vehicle shape as a candidate surface grid. The candidate surface grid is provided by the MDO driver for separate and interacting analyses by the associated engineering analysis codes, including CBAERO (step 104), POST2 (step 105), MSC NASTRAN (step 106), TPSSIZER (step 107), XWAT (step 108), etc. and provides communication between these codes as required by each code, in step 109. The outputs of these engineering analysis codes are optionally expressed as components of a composite shape/engineering vector $<Vj,Ej>$, in step 110, where Ej is a vector including the candidate engineering analysis parameters.

For example, the hypersonic aerodynamic performance may be calculated by the CBAERO code for the candidate vehicle shape, which the MDO driver provides for the POST2 code for trajectory optimization. The POST2 code establishes or adopts a candidate trajectory for that candidate shape. The candidate trajectory specific corresponding to the candidate shape is delivered by the MDO driver as a second instantiation of the CBAERO code, and this instantiation evaluates aerothermodynamics and aeroheating heating of the candidate vehicle shape along its candidate trajectory. The CBAERO-POST2 aerothermodynamic-trajectory analysis is preferably optimized to keep the peak heating below a maximum specified threshold value, and to keep integrated heat load below a maximum threshold value. The results of this process are provided to the MDO driver for evaluation in the Pareto-Optimum Determination step. In parallel to the CBAERO-POST2 aerothermodynamic engineering analysis step, a CBAERO-MSC NASTRAN structures process can be conducted which will take the aerodynamic loads experienced by the candidate shape, travelling on its candidate trajectory, and evaluate for suitable structural mass distribution to keep induced stresses on the structure below some specified maximum threshold value(s). Additional analysis may be incorporated in the engineering analysis stage, and the outputs may be provided to the MDO driver. The MDO driver includes, for the candidate shape under consideration, a mission constraint stage, where the shape and engineering analysis outputs (optionally expressed as a candidate composite vector $<Vj,Ej>$) are evaluated and compared against defined mission constraints to determine if any constraints are violated. (step 111)

If one or more of these mission constraints is violated, in step 111, the MDO driver determines, in step 112, that the candidate shape is not a member of the Pareto Optimum set and returns to the initial step to choose another candidate shape vector V(j+1). If none of the mission constraints is violated, the engineering analysis performance outputs are evaluated against the Pareto Optimization statement, in step 113, to determine if the candidate shape meets the statement definition for Pareto Optimum membership. If the candidate shape satisfies the Pareto Optimization statement, the candidate vector $<Vj,Ej>$ is added to the Pareto Optimization set, in step 114 If not, the candidate vector is not added to the Pareto Optimization set. Whatever is the conclusion here, the MDO driver will return to the beginning step to select another candidate shape vector V(j+1) and corresponding shape, in step 115. The process described above is repeated, with the MDO algorithm returning each iteration to the initial step, to continue examining further candidate shape vectors from the full set of design space for possible membership in the Pareto Optimization set until the full set of design parameters is fully explored.

Figure 19:
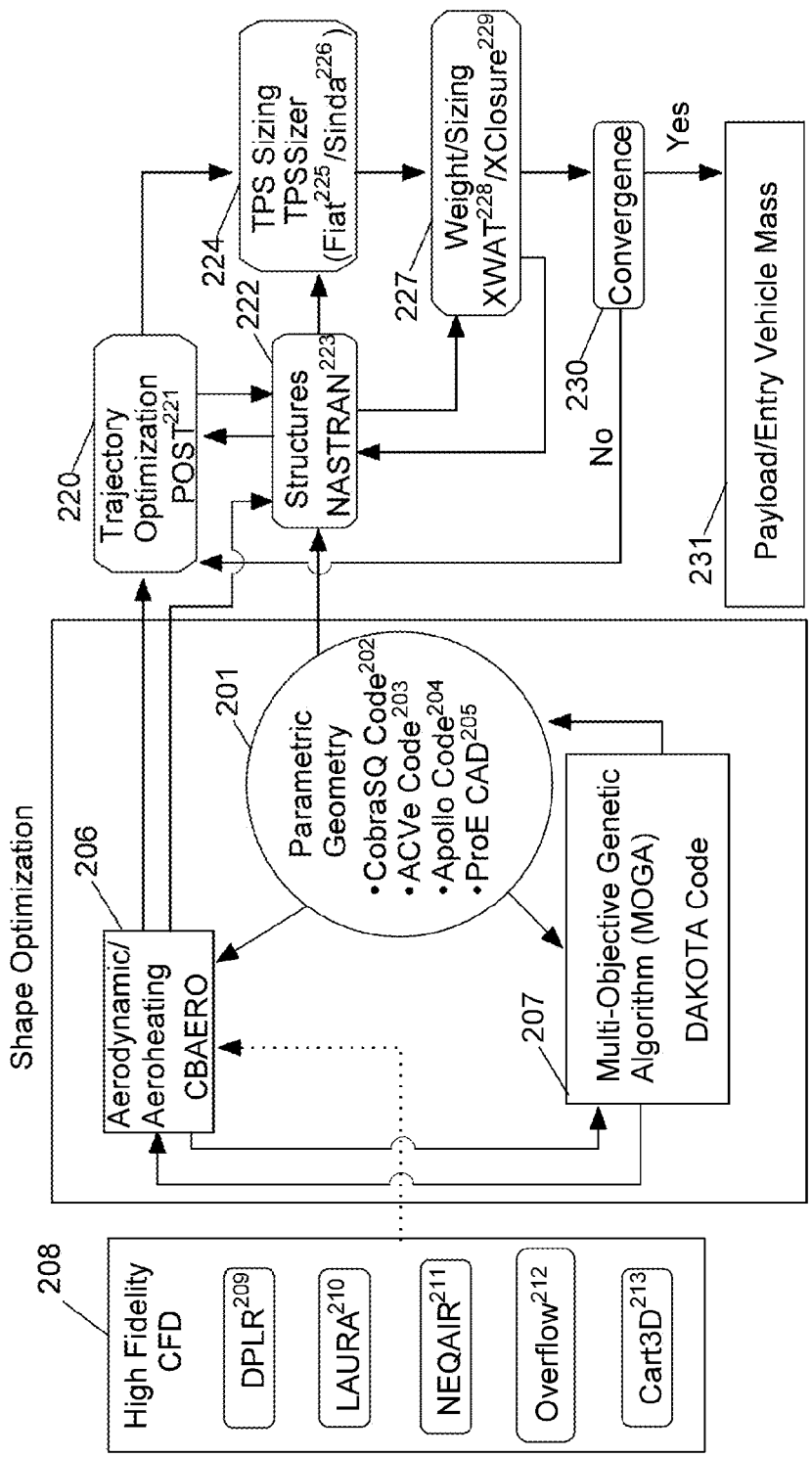

As a further example, FIG. 19 (same as FIG. 5) is an overall flow chart illustrating another procedure for implementing a Multi-Objective Generic Algorithm (MOGA) for multi-dimensional optimization of various groups of parameters associated with one or more of the 17 computer codes briefly discussed in Appendix B. Only one loop (among many such loops) for one candidate shape is described, with the MDO driver needing to conduct an outer loop so as to examine the full design space. The procedure begins the Parametric Geometry code module 201, which initially specifies approximately 30 geometric parameters (not all independent) that define the M segments of an aeroshell surface (e.g., M=6) and includes one or more of a COBRASQ code 202, an ACVe code 203, an Apollo code 204 and a ProE CAD code 205. A reference or initial vehicle trajectory is preferably specified, which may be subsequently modified. The Parametric Geometry module 201 communicates with an Aerodynamic/Aeroheating module 206, which is primarily the CBAERO code, and communicates with a multi-objective genetic Algorithm (MOGA) module 207, which is primarily the DAKOTA code. The CBAERO code relies upon a High Fidelity CFD module 208 that includes one or more of a DPLR code 209, a LAURA code 210, a NEQAIR code 211, an Overflow code 212 and a CART3D code 213.

The CBAERO code and the DAKOTA codes interact with each other throughout the following procedures. The Parametric Geometry module 201, the Aerodynamic/Aeroheating module 206 and the MOGA module 207 provide iterative shape optimization, using the MOGA code 207.

.An output from the Aerodynamic/Aeroheating module 206 is received by a Trajectory Optimization module 220 that includes a POST2 code 221. The Trajectory Optimization code 220 exchanges data with a Structures code 222, including an MSC NASTRAN code 223. The Trajectory Optimization module 220 and the Structures module 223 both exchange data with a TPSSIZER module 224, including one or more of a Fiat code 225, and a Sinda code 226. The Structures module 223 and the TPSSIZER module 224 both exchange data with a Weight/Sizing module 227, which includes one or more of an XWAT code 228 and an XClosure code 229, and which exchanges data between the Trajectory module 210 and the Structures module 223. An output of the Weight/Sizing module 225 is received by a Convergence Test module 230, which determines if the various optimization codes are converging. If the answer to the convergences query is "no," the results are returned to the Trajectory Optimization module 210 and elsewhere for further processing. If the answer to the convergence query is "yes," the results are delivered to a Payload/Entry Vehicle Mass module 231

Figure 20A:
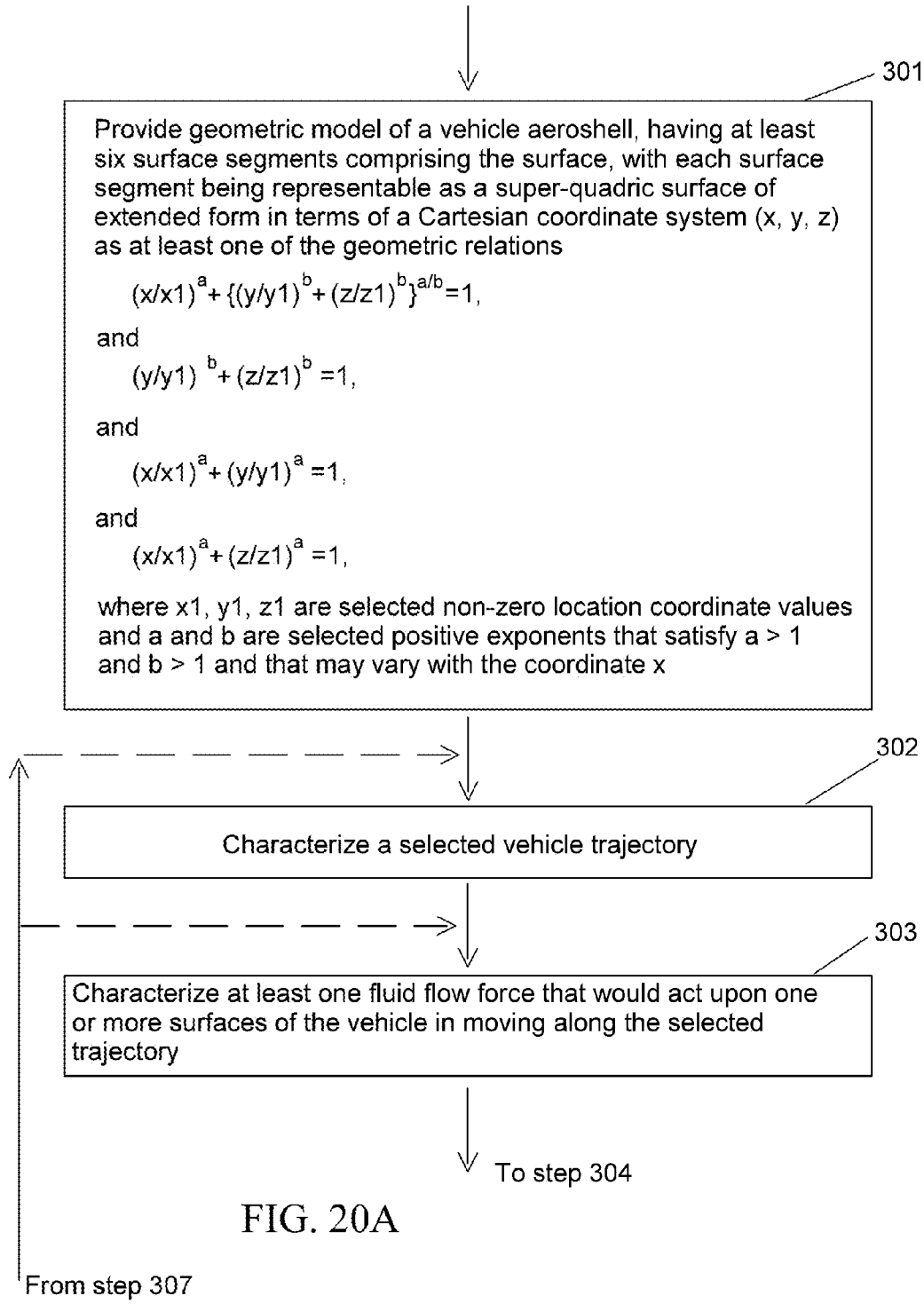
Figure 20B:
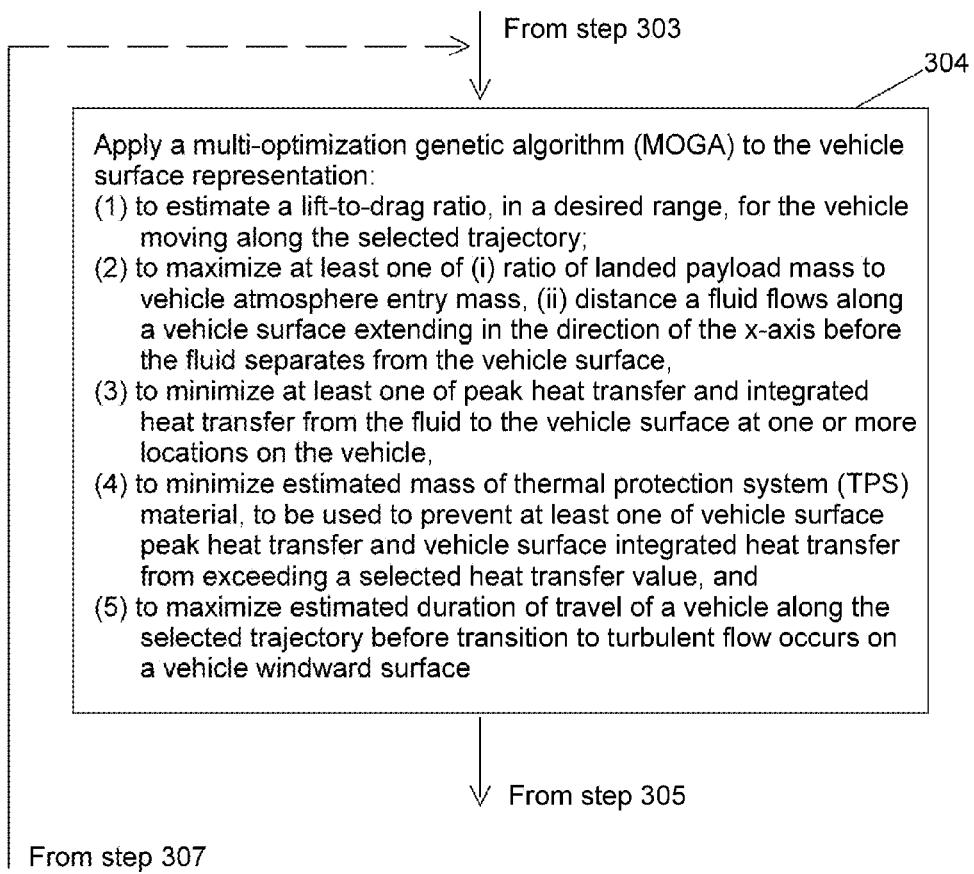
Figure 20C:
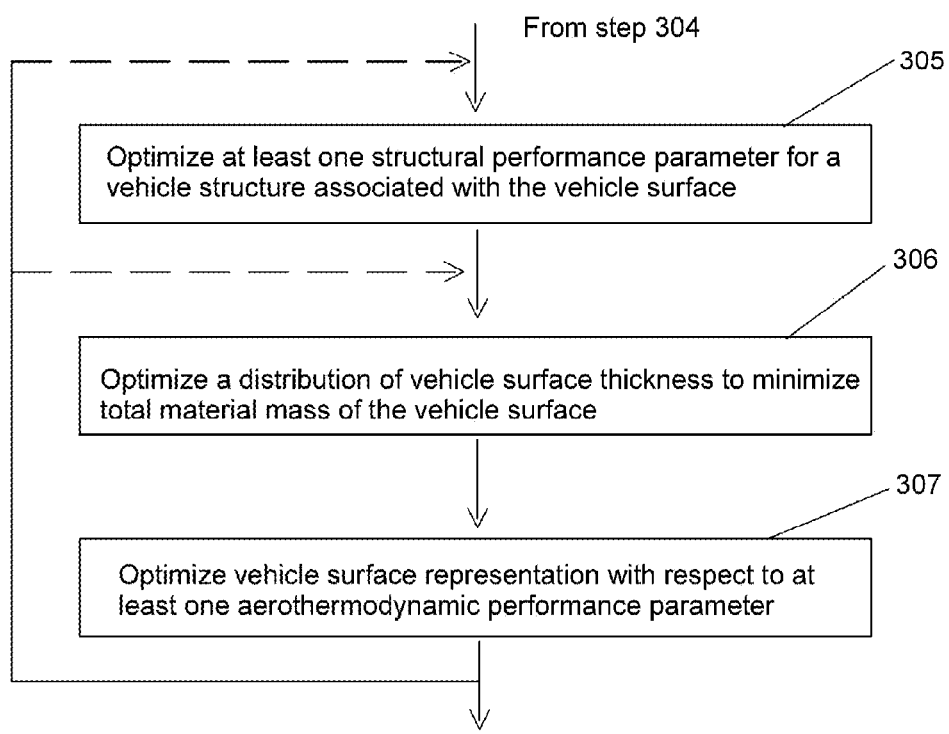

FIG. 20 is a flow chart illustrating another alternatively described procedure for implementing a Multi-Objective Generic Algorithm (MOGA) for multi-dimensional optimization of various groups of parameters associated with one or more of the 17 computer codes briefly discussed in Appendix A. Again only one outer loop (among many such loops) is described for one candidate shape. In step 301, a geometric model of a vehicle aeroshell surface is provided, having M surface segments (M≥1, for example, M=6) of the vehicle surface at selected locations and orientations, with at least one surface segment being representable mathematically as a super-quadric surface of extended form in terms of a Cartesian coordinates system (x,y,z) as at least one geometric relation, drawn from $$(x/x1)^a + \{(y/y1)^b + (z/z1)^b\}^{a/b} = 1,$$

and $$(y/y1)^b + (z/z1)^b = 1,$$

and $$(x/x1)^a + (y/y1)^a = 1,$$

and $$((x/x1)^a + (z/z1)^a = 1,$$

where x1, y1 and z1 are positive semi-axis lengths, and y1 and z1 may vary with x, a and b are exponents with values greater than 1, which may vary with x, the x-axis is oriented from back to front along the vehicle surface, and x is measured along a centerline of the vehicle surfaces Each surface segment may involve all three coordinates, x, y and z, or may involve two of these three coordinates, depending upon location and orientation of the segment. Surface segment interfaces between any two adjacent segments are at least C1 continuous.

In step 302, a selected (initial) trajectory of the vehicle through a selected fluid atmosphere is characterized. In step 303, at least one fluid flow force that would act upon one or more surface of the vehicle in moving along the selected trajectory, is characterized.

In step 304, a multi-optimization genetic algorithm (MOGA) is applied to the surface representation of the vehicle: (1) to estimate a lift-to-drag ratio, in a desired range, for the vehicle moving along the selected trajectory, (2) to maximize at least one of (2-i) ratio of landed payload mass to vehicle atmosphere entry mass and (2-ii) distance a fluid flows along the vehicle surface extending in the direction of the x-axis before the fluid separates from the vehicle surface; (3) to minimize at least one of peak heat transfer and integrated heat transfer from the fluid to the vehicle surface at one or more locations on the vehicle; (4) to minimize estimated mass of thermal protection system (TPS) material to be used to prevent at least one of the vehicle surface peak heat transfer and vehicle surface integrated heat transfer from exceeding a selected heat transfer limit value; and (5) to maximize estimated duration of travel of the vehicle along the selected trajectory before transition to turbulent flow occurs on a vehicle windward surface. In step 305, a vehicle structure, associated with the vehicle surface, is optimized with respect to at least one structural performance parameter for the vehicle. In step 306, a distribution of vehicle surface thickness is optimized to minimize total material mass of the vehicle surface. In step 307, the vehicle surface representation is optimized with respect to at least one aerothermodynamic/aeroheating performance parameter for the vehicle. Steps 302, 303, 304, 305, 306 and/or 307 are optionally iterated upon in a multi-level optimization procedure.

One often begins with a (target) total mass of the (loaded) vehicle and an selected trajectory and iteratively optimizes the groups of parameters in steps 301-307 in order to move closer to the total target mass and to a preferred trajectory. If the computed total mass proves to be too large to reach the target mass, the target mass may be incremented in one or more mass steps Am until the (modified) target mass can be reached by the iterative optimization. Likewise, if the computed total mass is already much smaller than the target mass.

REFERENCES

1. Brown, J. L. "The Effect of Forebody Geometry on Turbulent Heating and Thermal Protection System Sizing for Future Mars Missions Concepts," International Planetary Probe Workshop 4, June, 2006.
2. Wright, Henry, S., Oh, David, Y., Weshelle, Carlos H., Fisher, Jody L., Dyke, R. Eric, Edquist, Karl T., Brown, James L., Justh, Hilary L., Munk, Michelle M., "Mars Aerocapture Sytems Study," NASA TM-2006-214522, November 2006.
3. Garcia, J. A., Brown, J. L., Bowles J. V., Kinney, D. J., and Huynh L. C., "A Parametric Co-Optimization of Lifting Blunt Body Vehicle Concepts for Atmospheric Entry", 21st International Conference on Parallel Computational Fluid Dynamics, May 18-22, 2009, Moffett Field, Calif.
4. Brown, J. L., Garcia, J. A., Kinney, D. K., "An Asymmetric Capsule Vehicle Geometry Study for CEV", 45th AIAA Aerospace Sciences Meeting and Exhibit, January 2007, Nevada.
5. Brown, J. L., Garcia, J. A., Prahbu, D. K., NASA, Moffett Field, Calif. U.S. Pat. No. 7,431,242 B1 for "Re-Entry Vehicle Shape for Enhanced Performance", issued 7 Oct. 2008.
6. Kinney D., "Aero-Thermodynamics for Conceptual Design," AIAA-2004-31, 42nd AIAA Aerospace Sciences Meeting and Exhibit, Reno Nev., January 2004.
7. Wright, M. J., Candler, G., and Bose, D., "Data-Parallel Line Relaxation Method for the Navier-Stokes Equations," AIAA J., Vol. 36, No. 9, 1998, pp. 1603-1609.
8. Whiting, E. E., Park, C, Liu, Y, Arnold, J 0, and Paterson, J A, "NEQAIR96, Nonequilibrium and Equilibrium Radiative Transport and Spectra Program: User's Manual," NASA RP-1389, December 1996.
9. Kinney D., "Aerothermal Anchoring of CBAERO Using High Fidelity CFD," AIAA-2007-0608, 45th AIAA Aerospace Sciences Meeting and Exhibit, Reno Nev., January 2007.
10. G. L. Brauer, et al, "Capabilities and Applications of the program to Optimize Simulated Trajectories (POST)," NASA CR-2770, February 1977.
11. MSC. Nastran V2008.0 (Intel Windows .NET 5.2), MSC. Software Corporation, Santa Ana, Calif. URL: http://www.mscsoftware.com/Products/Default.aspx
12. McGuire M. K., Bowles J., Yang L., Kinney D., Roberts C., "TPS Selection & Sizing Tool Implemented in an Advanced Engineering Environment," AIAA-2004-342, 42nd AIAA Aerospace Sciences Meeting and Exhibit
13. Chen, Y.-K., and Milos, F. S., "Ablation and Thermal Analysis Program for Spacecraft Heatshield Analysis," J. Spacecraft and Rockets, vol. 36, No. 3, 1999, pp. 475-483.
14. CEV Thermal Protection System (TPS) Margin Management Plan ID: C-TPSA-A-DOC-7005.
15. X. Jiang, P. Gage, J. C. Vander Kam, M. Qu, "Weights Analysis of Space Launch Vehicles in an Advanced Engineering Environment", 10th AIAA/ISSMO Multidisciplinary Analysis and Optimization Conference 2004.
16. Eldred, M. S., Brown, S. L., Adams, B. M., Dunlavy, D. M., Gay, D. M., Swiler, L. P., Giunta, A. A., Hart, W. E., Watson, J.-P., Eddy, J. P., Griffin, J. D., Hough, P. D., Kolda, T. G., Martinez-Canales, M. L. and Williams, P. J., "DAKOTA, A Multilevel Parallel Object-Oriented Framework for Design Optimization, Parameter Estimation, Uncertainty Quantification, and Sensitivity Analysis: Version 4.0 Users Manual," Sandia Technical Report SAND2006-6337, October 2006. Updated September 2007 (Version 4.1) and November 2008 (Version 4.2).
17. Goldberg, D. E., "Genetic Algorithms in Search, Optimization and Machine Learning," Addison-Wesley, Reading, Mass., 59-88, 1989.
18. Davis, L., "Handbook of Genetic Algorithms," Van Nostrand Reinhold, New York, 1991.
19. "Entry, Descent and Landing Systems Analysis (EDL-SA) for High Mass Exploration and Science Mars Mission Systems", Year 1 Report Document No.: EDLSA-002rev1, 4 December, 2009 (NASA TM to be published) and communications with key EDL-SA team members.
20. Bowles, J. V., "Conceptual Studies Activities", Proceedings of the Second National Aerospace Plane Symposium, Applied Physics Laboratory, Laurel, Md. November 1986.

What is claimed is:

1. A method for simultaneously optimizing performance of a baseline lifting blunt body vehicle to an optimized lifting blunt body vehicle that moves through a fluid medium at speeds greater than the speed of sound through the fluid, the method comprising:

providing a computer and computer code that is programmed:

(1) to provide a geometric model of a vehicle aeroshell surface of the baseline lifting blunt body vehicle having M surface segments (M≥1) of the vehicle surface at selected locations and orientations, with at least one surface segment being representable mathematically as a super-quadric surface with an associated candidate shape vector V including N geometric parameters (N≥5) that describe the super-quadric surface in terms of a Cartesian coordinates system (x,y,z) as at least one geometric relation, drawn from $$(x/x1)^a + \{(y/y1)^b + (z/z1)^b\}^{a/b} = 1$$

and $$(y/y1)^b + (z/z1)^b = 1$$

and $$(x/x1)^a + (y/y1)^a = 1$$

and $$((x-x0)/x1)^a + (z/z1)^a = 1,$$

where x1, y1 and z1 are positive semi-axis lengths, and y1 and z1 may vary with x, a and b are exponents with values greater than 1, which may vary with x, the x-axis is oriented from back to front along the vehicle surface, and (x0,0,0) is a selected origin for the vehicle planar section on a centerline of the vehicle surface, where each section may involve all three coordinates, x, y and z, or may involve two of these three coordinates, depending upon location and orientation of the planar section, and where interfaces between any two adjacent surface segments are at least C1 continuous;

(2) to provide a candidate vehicle trajectory that the vehicle is postulated to follow through a selected fluid atmosphere;

(3) to provide a candidate vehicle structure mass distribution for the vehicle;

(4) to provide a candidate distribution of thermal protection system (TPS) mass on the vehicle;

(5) to analyze a vehicle-fluid interaction between the vehicle structure, the candidate structure mass distribution and candidate TPS mass distribution, traveling along the candidate trajectory, and the fluid atmosphere;

(6) to analyze structural responses of the vehicle, traveling along the candidate trajectory, (7) to compute at least one vehicle performance parameter associated with a combination of the candidate shape vector V, the candidate vehicle trajectory, the candidate structure mass distribution and candidate TPS mass distribution, traveling along the candidate trajectory;

(8) to provide a Pareto Optimum set, which may initially be an empty set, of vehicle performance values representing performance of at least one preceding choice of candidate shape vector V, candidate vehicle trajectory, candidate structure mass distribution, and candidate TPS mass distribution as the vehicle moves along a corresponding preceding candidate trajectory in the fluid atmosphere, where the Pareto Optimum set includes only performance values that equal or exceed a specified Pareto threshold value;

(9) to determine if the at least one vehicle performance parameter satisfies a specified set of constraints associated with flight of the vehicle through the fluid atmosphere;

(10) where at least one of the set of constraints in not satisfied, to return to step (1) and to repeat steps (1)-(9);

(11) where all of the constraints in the set are satisfied, to compare the at least one candidate vehicle performance parameter for the candidate shape vector V, combined with a candidate engineering performance vector E including the candidate vehicle trajectory, the candidate structure mass distribution, and the candidate TPS mass distribution with a corresponding performance parameter for each of the Pareto Optimum set of performance values

(12) when the candidate vehicle performance parameter is not at least equal to the Pareto threshold value, to return to the step (1) and to repeat steps (1)-(9); and

(13) when the candidate vehicle performance parameter is at least equal to the Pareto threshold value, to add the vehicle performance parameter and the associated candidate shape vector V and the candidate engineering performance vector E to the Pareto Optimum set, and to return to step (1) at least once and to repeat steps (1)-(12) at least once, whereby using the computer and computer code, the baseline lifting blunt body vehicle is optimized based on at least one vehicle performance parameter to thereby determine the optimized lifting blunt body vehicle.

2. The method of claim 1, further comprising choosing at least one of said at least six surface segments of said vehicle surface to be at least one of an upper Nose section and a lower Nose section, described by said geometric relation $$(x/x1)^a \{(y/y1)^b + (z/z1)^b\}^{a/b} = 1.$$

3. The method of claim 1, further comprising choosing at least one of said at least six surface segments of said vehicle surface to be mid-body Base Rib section, oriented substantially perpendicular to said x-axis and described by said geometric relation $$(y/y1)^b + (z/z1)^b = 1,$$

and at least one of said semi-length values, y1 and z1, is a specified function of said coordinate x.

4. The method of claim 1, further comprising choosing at least one of said at least six surface segments of said vehicle surface to be at least one of an upper Aft-body section and a lower Aft-body section, described by said geometric relation $$(x/x1)^a + \{(y/y1)^b + (z/z1)^b\}^{a/b} = 1,$$

and said semi-length values, y1 and z1, and the exponent b are specified functions of said coordinate x.

5. The method of claim 1, further comprising choosing at least one of said at least six surface segments of said vehicle surface to comprise at least one of a lower Keel line and an upper Keel line, oriented parallel to an xz-plane and described by said geometric relation $$(x/x1)^a + \{(y/y1)^b + (z/z1)^b\}^{a/b} = 1.$$

where at least one of y1 and z1 is a specified function of said coordinate x.

6. The method of claim 1, further comprising choosing at least one of said at least six surface segments of said vehicle surface to comprise at least one of a forward Water line and an aft Water line, oriented parallel to an xy-plane and described by said geometric relation $$((x-x0)/x1)^a + (y/y1)^b = 1$$

where at least one of x1 and y1 is a specified function of said coordinate x and said exponent b is a specified function of x, b(x).

7. The method of claim 6, further comprising choosing said exponent b(x) for said aft Water line to vary linearly with said coordinate x.

8. The method of claim 6, further comprising choosing said exponent b(x) for said aft Water line as a spline fit over a selected interval of said coordinate x.

9. The method of claim 1, further comprising choosing said desired range of said lift-to-drag ratio for said vehicle to be 0.3-0.5.

10. The method of claim 1, further comprising choosing said TPS material to be PICA.

11. A method for simultaneously optimizing performance of a baseline lifting blunt body vehicle to an optimized lifting blunt body vehicle that moves through a fluid medium at speeds greater than the speed of sound through the fluid, the method comprising:

providing a computer and computer code that is programmed:

(1) to provide a geometric model of a vehicle aeroshell surface of the baseline lifting blunt body vehicle having M surface segments (M≥1) of the vehicle surface at selected locations and orientations, with at least one surface segment being representable mathematically as a super-quadric surface with an associated candidate shape vector V including N geometric shape parameters (N≥5) that describe the super-quadric surface in terms of a Cartesian coordinates system (x,y,z) as at least one geometric relation, drawn from $$(x/x1)^a + \{(y/y1)^b + (z/z1)^b\}^{a/b} = 1$$

and $$(y/y1)^b + (z/z1)^b = 1$$

and $$(x/x1)^a + (y/y1)^a = 1$$

and $$((x-x0)/x1)^a + (z/z1)^a = 1,$$

where x1, y1 and z1 are positive semi-axis lengths, and y1 and z1 may vary with x, a and b are exponents with values greater than 1, which may vary with x, the x-axis is oriented from back to front along the vehicle surface, and (x0,0,0) is a selected origin for the vehicle planar section on a centerline of the vehicle surface, where each section may involve all three coordinates, x, y and z, or may involve two of these three coordinates, depending upon location and orientation of the planar section, and where interfaces between any two adjacent surface segments are at least C1 continuous;

(2) to provide a characterization of a selected trajectory of the vehicle through a selected fluid atmosphere;

(3) to provide a characterization of aerodynamics and aeroheating in non-equilibrium air, based on computer fluid dynamics (CFD) of at least one surface segment of the vehicle as the vehicle moves along the selected trajectory;

(4) to estimate forces on the vehicle structure that arise in response to the CFD forces as the vehicle moves along the desired trajectory;

(5) to optimize the forces on the vehicle structure to achieve at least one of the following: (i) a peak force or stress on the vehicle structure is no greater than a first threshold value, and (ii) an integrated value of a force or stress on a portion of the vehicle surface is no greater than a second threshold value;

(5) to optimize mass distribution of thermal protection materials on the vehicle surface in order to achieve at least one of the following objectives: (i) peak heating at a selected location on the vehicle surface is no greater than a third threshold value and (ii) integrated heating of a selected portion of the vehicle surface is no greater than a fourth threshold value;

(6) to optimize vehicle surface mass so that total vehicle surface mass is no greater than a fifth threshold value; and (7) to optimize choice of the geometric parameters to achieve at least one of the optimizations in steps (4) and (5), whereby using the computer and computer code, the baseline lifting blunt body vehicle is optimized based on at least the mass distribution of thermal protection materials to thereby determine the optimized lifting blunt body vehicle.

12. The method of claim 11, further comprising choosing at least one of said at least six surface segments of said vehicle surface to be at least one of an upper Nose section and a lower Nose section, described by said geometric relation $(x/x1)^a + \{(y/y1)^b + (z/z1)^b\}^{a/b} = 1$.

13. The method of claim 11, further comprising choosing at least one of said at least six surface segments of said vehicle surface to be mid-body Base Rib section, oriented substantially perpendicular to said x-axis and described by said geometric relation $(y/y1)^b + (z/z1)^b = 1$, and at least one of said semi-length values, y1 and z1, is a specified function of said coordinate x.

14. The method of claim 11, further comprising choosing at least one of said at least six surface segments of said vehicle surface to be at least one of an upper Aft-body section and a lower Aft-body section, described by said geometric relation $(x/x1)^a + \{(y/y1)^b + (z/z1)^b\}^{a/b} = 1$, and said semi-length values, y1 and z1, and the exponent b are specified functions of said coordinate x.

15. The method of claim 11, further comprising choosing at least one of said at least six surface segments of said vehicle surface to comprise at least one of a lower Keel line and an upper Keel line, oriented parallel to an xz-plane and described by said geometric relation $(x/x1)^a + \{(y/y1)^b + (z/z1)^b\}^{a/b} = 1$, where at least one of y1 and z1 is a specified function of said coordinate x.

16. The method of claim 11, further comprising choosing at least one of said at least six surface segments of said vehicle surface to comprise at least one of a forward Water line and an aft Water line, oriented parallel to an xy-plane and described by said geometric relation $((x-x0)/x1)^a + (y/y1)^b = 1$ where at least one of x1 and y1 is a specified function of said coordinate x and said exponent b is a specified function of x, b(x).

17. The method of claim 16, further comprising choosing said exponent b(x) for said aft Water line to vary linearly with said coordinate x.

18. The method of claim 16, further comprising choosing said exponent b(x) for said aft Water line as a spline fit over a selected interval of said coordinate x.

19. The method of claim 11, further comprising choosing said desired range of said lift-to-drag ratio for said vehicle to be 0.3-0.5.

20. The method of claim 1, further comprising choosing said TPS material to be PICA.

21. A method for simultaneously optimizing performance of a baseline lifting blunt body vehicle to an optimized lifting blunt body vehicle that moves through a fluid medium at speeds greater than the speed of sound through the fluid, the method comprising:

providing a computer and computer code that is programmed:

(1) to provide a geometric model of a vehicle aeroshell surface of the baseline lifting blunt body vehicle having M surface segments (M≥1) of the vehicle surface at selected locations and orientations, with at least one surface segment being representable mathematically as a super-quadric surface with an associated candidate shape vector V including N geometric shape parameters (N≥5) that describe the super-quadric surface in terms of a Cartesian coordinates system (x,y,z) as at least one geometric relation, drawn from $(x/x1)^a + \{(y/y1)^b + (z/z1)^b\}^{a/b} = 1$ and $(y/y1)^b + (z/z1)^b = 1$ and $(x/x1)^a + (y/y1)^a = 1$ and $((x-x0)/x1)^a + (z/z1)^a = 1$, where x1, y1 and z1 are positive semi-axis lengths, and y1 and z1 may vary with x, a and b are exponents with values greater than 1, which may vary with x, the x-axis is oriented from back to front along the vehicle surface, and (x0,0,0) is a selected origin for the vehicle planar section on a centerline of the vehicle surface, where each section may involve all three coordinates, x, y and z, or may involve two of these three coordinates, depending upon location and orientation of the planar section, and where interfaces between any two adjacent surface segments are at least C1 continuous;

(2) to provide a characterization of a selected trajectory of the vehicle through a selected fluid atmosphere;

(3) to estimate at least one fluid flow force that would act upon one or more surface of the vehicle in moving along the selected trajectory;

(4) to apply a multi-optimization genetic algorithm (MOGA) to the surface representation of the vehicle: (1) to estimate a lift-to-drag ratio, in a desired range, for the vehicle moving along the selected trajectory, (2) to maximize at least one of (2-i) ratio of landed payload mass to vehicle atmosphere entry mass and (2-ii) distance a fluid flows along the vehicle surface extending in the direction of the x-axis before the fluid separates from the vehicle surface; (3) to minimize at least one of peak heat transfer and integrated heat transfer from the fluid to the vehicle surface at one or more locations on the vehicle; (4) to minimize estimated mass of thermal protection system (TPS) material to be used to prevent at least one of the vehicle surface peak heat transfer and vehicle surface integrated heat transfer from exceeding a selected heat transfer limit value; and (5) to maximize estimated duration of travel of the vehicle along the selected trajectory before transition to turbulent flow occurs on a vehicle windward surface, (5) to optimize a distribution of vehicle surface thickness to minimize total material mass of the vehicle surface; and, (6) to optimize the vehicle surface representation with respect to at least one aerothermodynamic performance parameter for the vehicle; and (7) to optimize a distribution of vehicle surface thickness to minimize total material mass of the vehicle surface, whereby using the computer and computer code, the baseline lifting blunt body vehicle is optimized based on at least vehicle surface thickness to thereby determine the optimized lifting blunt body vehicle.

22. The method of claim 21, further comprising choosing at least one of said at least six surface segments of said vehicle surface to be at least one of an upper Nose section and a lower Nose section, described by said geometric relation $$(x/x1)^a + \{(y/y1)^b + (z/z1)^b\}^{a/b} = 1.$$

23. The method of claim 21, further comprising choosing at least one of said at least six surface segments of said vehicle surface to be mid-body Base Rib section, oriented substantially perpendicular to said x-axis and described by said geometric relation $$(y/y1)^b + (z/z1)^b = 1,$$

and at least one of said semi-length values, y1 and z1, is a specified function of said coordinate x.

24. The method of claim 21, further comprising choosing at least one of said at least six surface segments of said vehicle surface to be at least one of an upper Aft-body section and a lower Aft-body section, described by said geometric relation $$(x/x1)^a + \{(y/y1)^b + (z/z1)^b\}^{a/b} = 1,$$

and said semi-length values, y1 and z1, and the exponent b are specified functions of said coordinate x.

25. The method of claim 21, further comprising choosing at least one of said at least six surface segments of said vehicle surface to comprise at least one of a lower Keel line and an upper Keel line, oriented parallel to an xz-plane and described by said geometric relation $$(x/x1)^a + \{(y/y1)^b + (z/z1)^b\}^{a/b} = 1.$$

where at least one of y1 and z1 is a specified function of said coordinate x.

26. The method of claim 21, further comprising choosing at least one of said at least six surface segments of said vehicle surface to comprise at least one of a forward Water line and an aft Water line, oriented parallel to an xy-plane and described by said geometric relation $$((x-x0)/x1)^a (y/y1)^b = 1$$

where at least one of x1 and y1 is a specified function of said coordinate x and said exponent b is a specified function of x, b(x).

27. The method of claim 26, further comprising choosing said exponent b(x) for said aft Water line to vary linearly with said coordinate x.

28. The method of claim 26, further comprising choosing said exponent b(x) for said aft Water line as a spline fit over a selected interval of said coordinate x.

29. The method of claim 21, further comprising choosing said desired range of said lift-to-drag ratio for said vehicle to be 0.3-0.5.

30. The method of claim 21, further comprising choosing said TPS material to be PICA.

* * * * *